(12) United States Patent
Loce et al.

(10) Patent No.: US 7,755,638 B2
(45) Date of Patent: Jul. 13, 2010

(54) TINTED EDGE ENHANCEMENT USING LOOK-UP TABLE EDGE PIXEL IDENTIFICATION

(75) Inventors: Robert P. Loce, Webster, NY (US); Beilei Xu, Penfield, NY (US); Stuart A. Schweid, Pittsford, NY (US); Son H. Nguyen, Rolling Hills Estates, CA (US); Michael Branciforte, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 867 days.

(21) Appl. No.: 11/318,131

(22) Filed: Dec. 23, 2005

(65) Prior Publication Data

US 2007/0146796 A1    Jun. 28, 2007

(51) Int. Cl.
*G09G 5/02* (2006.01)

(52) U.S. Cl. ............... 345/596; 345/611; 345/643; 382/199; 382/266; 382/269

(58) Field of Classification Search .............. None
See application file for complete search history.

(56) References Cited

U.S. PATENT DOCUMENTS

| | | | |
|---|---|---|---|
| 5,680,222 A * | 10/1997 | Ashworth | ........... 358/3.16 |
| 6,144,461 A | 11/2000 | Crean et al. | |
| 6,167,166 A | 12/2000 | Loce et al. | |
| 6,181,438 B1 | 1/2001 | Bracco et al. | |
| 6,243,499 B1 | 6/2001 | Loce et al. | |
| 6,606,420 B1 | 8/2003 | Loce et al. | |
| 6,763,141 B2 | 7/2004 | Xu et al. | |
| 6,775,410 B1 | 8/2004 | Loce et al. | |
| 7,518,618 B2 * | 4/2009 | Loce et al. | ........... 345/611 |
| 7,565,015 B2 * | 7/2009 | Loce et al. | ........... 382/199 |
| 7,688,473 B2 * | 3/2010 | Purdum et al. | ........... 358/3.2 |
| 2003/0058474 A1 | 3/2003 | Loce et al. | |
| 2005/0129328 A1 | 6/2005 | Saber et al. | |

OTHER PUBLICATIONS

Wadle, Dr. Weinrich, "An Introduction to Screening Technology", May 2002, Heidelberger Druckmaschinen AG.*
Richard Rubinstein, *Digital Typography: An Introduction to Type and Composition for Computer System Design*, Addison-Wesley Publishing Company, Reading, MA, Copyright 1988, pp. 78-80.

* cited by examiner

*Primary Examiner*—Antonio A Caschera
(74) *Attorney, Agent, or Firm*—Fay Sharpe LLP

(57) ABSTRACT

The present application is a method of producing digital image objects with enhanced halftone edges. The method operates by selecting a target pixel location within the digital image; observing a set of pixels within a pixel observation window superimposed on the digital image relative to the target pixel location; generating edge-state codes for a plurality of pairs of neighboring vectors of pixels within the pixel observation window; generating edge-identification codes from the plurality of edge-state codes using at least one look-up table; and, utilizing the edge-identification code to select and apply to the digital image at the target pixel either a first halftone screen having a first fundamental frequency and a first angle or a second halftone screen having a second fundamental frequency and a second angle, wherein the second frequency and second angle are harmonically matched to the first frequency and first angle. The method solves the problem of ragged edges on halftone tints as an automated, operation, with a computing architecture that is readily adapted to a wide variety of tinted edge conditions, and which can be readily adapted to real-time applications.

20 Claims, 13 Drawing Sheets

TINTED EDGE ENHANCEMENT USING LOOK-UP TABLE EDGE PIXEL IDENTIFICATION

CROSS-REFERENCE TO COPENDING APPLICATIONS

Attention is directed to copending Applications co-filed at the same time with the present Application: U.S. application Ser. No. 11/317,818, filed Dec. 23, 2005, entitled "EDGE PIXEL IDENTIFICATION"; U.S. application Ser. No. 11/317,782, filed Dec. 23, 2005, now U.S. Pat. No. 7,518,618, entitled "ANTI-ALIASED TAGGING USING LOOK-UP TABLE EDGE PIXEL IDENTIFICATION"; and U.S. application Ser. No. 11/317,427, filed Dec. 23, 2005, entitled "CORNER SHARPENING USING LOOK-UP TABLE EDGE PIXEL IDENTIFICATION". The disclosure found in each of these copending applications is hereby incorporated by reference in its entirety.

CROSS-REFERENCE TO RELATED APPLICATIONS

Cross reference is made to the following applications, the disclosures of each of which are totally incorporated by reference herein: U.S. application Ser. No. 10/973,725, entitled "TINTED EDGE ENHANCEMENT USING HARMONIC HALFTONES FOR THE BOUNDARY PIXELS", to C. Purdum, R. Loce, B. Xu, D. Lieberman, M. Gwaltney, J. McEvain, C. Hains, and U.S. patent application Ser. No. 10/909,627, entitled "METHOD FOR MINIMIZING BOUNDARY DEFECTS USING HALFTONE CLASSES WITH MATCHED HARMONICS" to Inventors Robert P. Loce, Charles M. Hains, Beilei Xu, Connie F. Purdum, and Xiaoxue (Shirley) Cheng. The appropriate components and processes of the above co-pending application may be selected for the invention of the present application in embodiments thereof.

BACKGROUND AND SUMMARY

This disclosure relates generally to digital processing of image data. This disclosure also relates generally to halftoning methods, and more particularly to an edge identification and edge halftoning method for producing halftone screens with improved edge appearance. This disclosure relates particularly to tinted edges and their enhancement.

Printers that utilize halftones can suffer from an edge defect on halftoned tints, which includes tinted text. The periodicity of the halftone can produce a significant raggedness at the edges of tints. In some marking processes small fragmented edge dots do not print, or print undersized, thereby leaving a gap that appears very ragged. This defect is a significant dissatisfier for many consumers of printed tints. The problem is illustrated in FIGS. 17 and 18.

FIG. 17A is a photomicrograph of a print from an offset printer depicting a printed edge. FIG. 17B is a schematical blow-up of the circled area in FIG. 17A and depicts in greater clarity the pixels of FIG. 17A. As can be seen by FIGS. 17A and 17B the edge rendering as provided by an offset printer achieves a very clean cut edge. FIG. 18A is a photomicrograph of a print from an electro-photographic digital printer. FIG. 18B is a blow-up of the circled area in FIG. 18A. Here the rendered edge is not only less clean but halftone dots that are split by the edge may print proportionally too small or too large, with respect to an un-split dot, depending upon the physical conditions of the marking process, thus effecting a ragged appearance.

An edge within an image is a sharp change in local intensity or lightness. In other words, edges are features within an image that possess strong intensity contrast. Edges occur between distinct objects in a scene, or within textures and structure within an object. For instance, typographic characters on a white page background produce distinct edges. Edge pixels in a digital image are those pixels that occur at and about an edge in the image.

Two key properties of an edge are strength and orientation. Edge strength is a measure of the contrast of an edge. A black typographic character on a white background produces stronger edges than a gray character on a white background. Edge orientation can be described by a variety of measures, such as angle quantified in degrees or by classes such as vertical, horizontal, and diagonal.

Other attributes of edges are also useful to image analysis and image processing. For instance, classification of combined edges, such as corners, has been used in object recognition and in image enhancement applications. Edge thickness is a measure that provides information on the breadth of a local contrast change and can indicate a degree of blur in an image, see for example: U.S. Pat. No. 6,763,141, entitled "ESTIMATION OF LOCAL DEFOCUS DISTANCE AND GEOMETRIC DISTORTION BASED ON SCANNED IMAGE FEATURES," to inventors B. Xu, R. Loce, which is hereby incorporated in its entirety for its teachings. Inner edges and outer edges refer to regions just inside of or just outside of a given object, respectively, and have been used in applications such as character stroke thinning and thickening. The presence or absence of an edge is an edge-related property that has been used in applications such as image classification and recognition. Distance from an edge is also an edge-related property that has been used in image enhancement applications.

Edge detection in digital image processing typically employs a collection of methods used to identify or modify edge pixels or indicate properties of edges and edge pixels within an image. Edge detection methods are sometimes referred to simply as edge detectors. There are numerous applications of edge detectors in digital image processing for electronic printing. For example, identification of corner pixels has been used to sharpen corners within an image, see: U.S. Pat. No. 6,775,410, entitled "IMAGE PROCESSING METHOD FOR SHARPENING CORNERS OF TEXT AND LINE ART," to inventors R. Loce, X. Zhu, C. Cuciurean-Zapan. Identification of inner and outer border pixels has been used to control the apparent darkness of character strokes, see: U.S. Pat. No. 6,606,420, entitled "METHOD AND APPARATUS FOR DIGITAL IMAGE DARKNESS CONTROL IN SATURATED IMAGE STRUCTURES", to Loce et al; and U.S. Pat. No. 6,181,438, entitled "METHOD AND APPARATUS FOR DIGITAL IMAGE DARKNESS CONTROL USING QUANTIZED FRACTIONAL PIXELS," to Bracco et al. Also identification of anti-aliased pixels has been used for preferred rendering of those same pixels, see: U.S. Pat. No. 6,243,499, entitled "TAGGING OF ANTI-ALIASED IMAGES," to Loce et al.; U.S. Pat. No. 6,144,461, entitled "METHOD FOR GENERATING RENDERING TAGS TO FACILITATE THE PRINTING OF ANTI-ALIASED IMAGES," to Crean, et al.; and U.S. Pat. No. 6,167,166, entitled "METHOD TO ENABLE THE RECOGNITION AND RENDERING OF ANTIALIASED IMAGES," to Loce et al. All of the above cited are hereby incorporated by reference in their entirety for their teachings.

Edge detectors typically operate using a convolution mask and are based on differential operations. Differentials for edge/line detection are used to define color or brightness changes of pixels and their change directions. If there is an abrupt change of brightness within a short interval within an image, it means that within that interval there is high probability that an edge exists. One example of a convolution-based edge detector is the Roberts edge detector, which employs the square root of the magnitude squared of the convolution with the Robert's row and column edge detectors. The Prewitt edge detector employs the Prewitt compass gradient filters and returns the result for the largest filter response. The Sobel edge detector operates using convolutions with row and column edge gradient masks. The Marr-Hildreth edge detector performs two convolutions with a Laplacian of Gaussians and then detects zero crossings. The Kirsch edge detector performs convolution with eight masks that calculate gradient.

As indicated above, common edge detection methods employ a convolution-type computing architecture, usually with fixed coefficients. In the field of image processing, and in particular, for image processing in anticipation of electronic printing, the edge detection needs are numerous and varied. Further, image processing for electronic printing often requires that any processing method operate "real-time", within a small number of fixed clock cycles, thereby excluding more complicated methods as too computationally intensive. What is needed is a technique which will solve the problem of ragged edges on halftone tints as an automated, non-manual processing operation, with a computing architecture that is more readily adapted to a wide variety of tinted edge conditions than are the common convolution-based methods, and which can be readily adapted to real-time applications.

Disclosed in embodiments herein is an image processing method for producing digital image objects with enhanced halftone edges. The method includes the steps of selecting a target pixel location within the digital image; observing a set of pixels within a pixel observation window superimposed on the digital image relative to the target pixel location; generating edge-state codes for a plurality of pairs of neighboring vectors of pixels within the pixel observation window; generating edge-identification codes from the plurality of edge-state codes using at least one look-up table; and, utilizing the edge-identification code to select and apply to the digital image at the target pixel either a first halftone screen having a first fundamental frequency and a first angle or a second halftone screen having a second fundamental frequency and a second angle, wherein the second frequency and second angle are harmonically matched to the first frequency and first angle.

Further disclosed in embodiments herein is an image processing method for producing a digital image with enhanced halftone edges. The method comprises the steps of observing a set of pixels within a pixel observation window superimposed on the digital image relative to a target pixel location; generating edge-state codes for a plurality of pairs of neighboring vectors of pixels within the pixel observation window; generating edge-identification codes from the plurality of edge-state codes using at least one look-up table; wherein the edge-identification codes indicate proximity to a tinted edge; and, utilizing the edge-identification code to select and apply to the digital image at the target pixel either a first halftone screen having a first fundamental frequency and a first angle or a second halftone screen having a second fundamental frequency and a second angle, wherein the second frequency and second angle are harmonically matched to the first frequency and first angle.

Further disclosed in embodiments herein is an image processing method for producing a digital image with enhanced halftone edges. The method comprises observing a set of pixels within a pixel observation window superimposed on the digital image relative to a target pixel location; generating edge-state codes for a plurality of pairs of neighboring vectors of pixels within the pixel observation window; generating edge-identification codes from the plurality of edge-state codes using at least one look-up table; wherein the edge-identification codes indicate proximity to a tinted edge; and, utilizing the edge-identification code to select and apply to the digital image at the target pixel either a first halftone screen having a first fundamental frequency and a first angle or a second halftone screen having a second fundamental frequency and a second angle, wherein the second frequency and second angle are harmonically matched to the first frequency and first angle.

DETAILED DESCRIPTION

Figure 1:
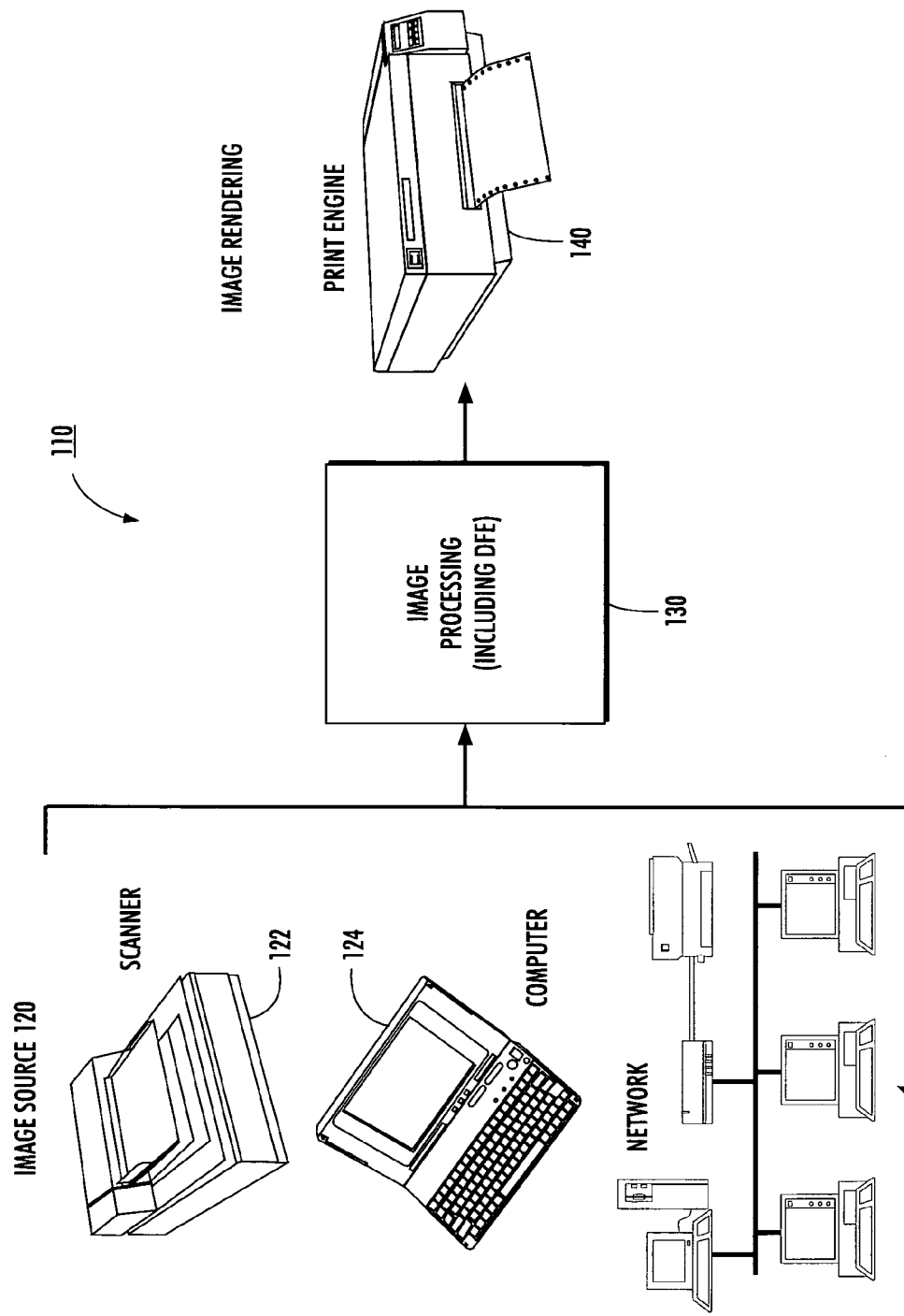
FIG. 1 is a general representation of a suitable system-level embodiment for one or more aspects of the teachings presented herein.

It is to be understood that the disclosure of embodiments following describe a digital data technique which identifies and enhances the edges of halftone tints to avoid a objectionable ragged appearance. For a general understanding of the present disclosure, reference is made to the drawings. In the drawings, like reference numerals have been used throughout to designate identical elements. In describing the present disclosure, the following term(s) have been used in the description.

The term "data" refers herein to physical signals that indicate or include information. An "image", as a pattern of physical light or a collection of data representing said physical light, may include characters, words, and text as well as other features such as graphics. A "digital image" is by extension an image represented by a collection of digital data. An image may be divided into "segments", each of which is itself an image. A segment of an image may be of any size up to and including the whole image. The term "image object" or "object" as used herein is believed to be considered in the art generally equivalent to the term "segment" and will be employed herein interchangeably.

In a digital image composed of data representing physical light, each element of data may be called a "pixel", which is common usage in the art and refers to a picture element. Each pixel has a location and value. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image. Although described herein as continuous tone processing, the present invention applies equally as well to the processing of color images, wherein each separation is treated, effectively, as a gray scale or continuous tone image. Accordingly, references herein to the processing of continuous tone (contone) or gray scale images is intended to include the processing of color image separations as well. An operation performs "image processing" when it operates on an item of data that relates to part of an image.

Digital "halftoning" refers to encoding methods that are used to reduce the number of quantization levels per pixel in a digital image, while maintaining the gray appearance of the image at normal viewing distance. Halftoning is widely employed in the printing and display of digital images. The need for halftoning encoding arises either because the physical processes involved are binary in nature or the processes have been restricted to binary operation for reasons of cost, speed, memory or stability in the presence of process fluctuations. Examples of such processes are most printing presses, ink jet printers, binary cathode ray tube (CRT) displays, and laser xerography. In most printing and display applications, the halftoned image is composed ideally of two gray levels, black and white. Spatial integration, plus higher level processing performed by the human visual system, of local area coverage of black and white pixels, provides the appearance of a gray level, or "continuous tone," image. Many halftone techniques readily extend to color and to quantization using more than two levels.

In the context of the present teaching "tint" refers to a color or colored object within an image that is not fully saturated. That is, the color is not represented by 100% area coverage of each of the individual colorants or color primaries that are used to form the color.

Turning now to FIG. 1, depicted therein is an embodiment of a digital imaging system suitable for one or more aspects of the present invention. In the system 110, image source 120 is used to generate image data that is supplied to an image processing system 130, and which produces output data for rendering by print engine 140. Image source 120 may include scanner 122, computer 124, network 126 or any similar or equivalent image input terminal. On the output end printer engine 140 is preferably a xerographic engine however print engine 140 may include such equivalent print technology alternatives as wax, ink jet, etc. The teachings presented herein are directed toward aspects of image processor 130 depicted in FIG. 1. In particular, the intention of the teachings presented herein is to identify, and process accordingly, edge pixels of tints within a digital image. It will be appreciated by those skilled in the art that the rendering of an image into a printable or displayable output format may be accomplished at any of a number of locations, which herein is provided for in but one example only as occurring within the image processing system 130 or within in the print engine 140.

Figure 2:
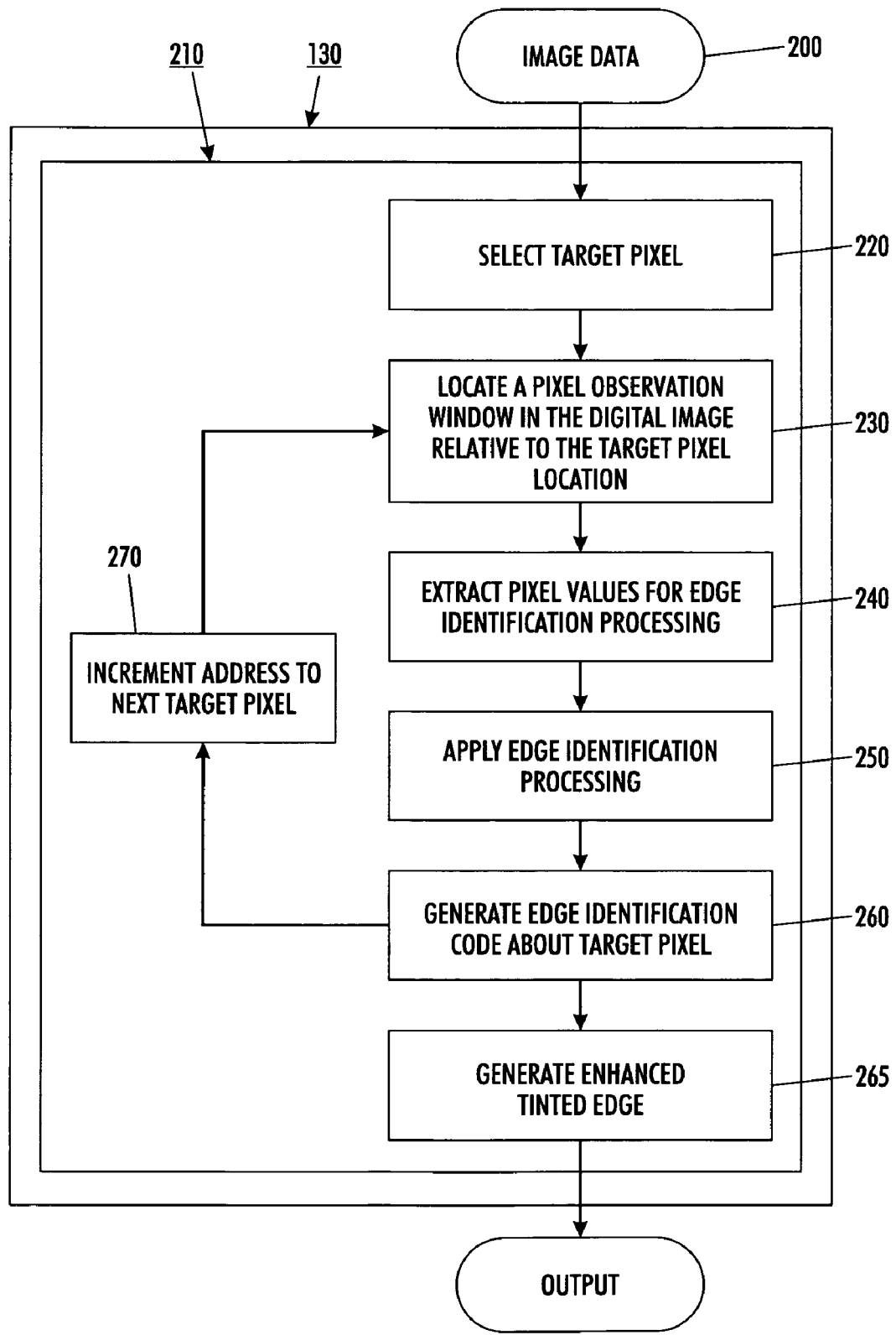
FIG. 2 depicts a flow chart of an image processing system containing an embodiment of the teachings presented herein.

Referring now to FIG. 2, shown therein is a diagram depicting the data flow in an example embodiment. Image processing system 130 receives raw (unprocessed) image input image data 200. Image processing system 130 includes an edge identification and tinted edge enhancement processor 210, and may contain other image processing operations as well. Within the edge identification and tinted edge enhancement processor 210 a target pixel is selected 220 and an observation window of pixels is located about the target pixel 230. In one embodiment, this window is 5×5 pixels in dimension with the center pixel as the window origin, where the origin pixel is used to locate the window on the target pixel. However, a smaller widow such as a 3×3, or in the alternative a larger size window, or even a window of a non-square shape, is well within the contemplation of the present disclosure. This window is stepped through the image pixel data. In one embodiment the origin pixel is stepped to target pixels from top to bottom and from left to right through all address locations within an image. Typically, all pixels within the input image become target pixels in a successive manner. At each location the pixel values are extracted from within the window as indicated in step 240.

Figure 3:
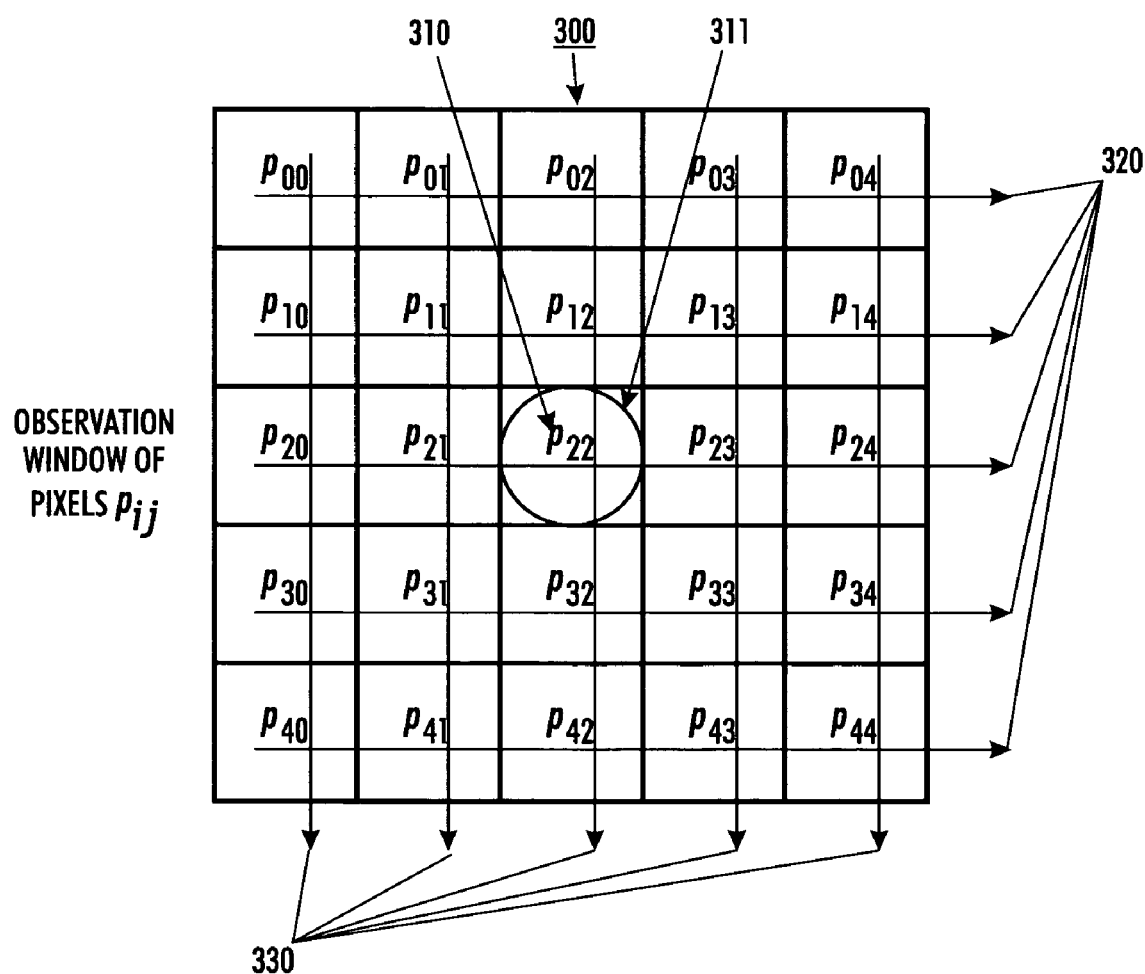
FIG. 3 schematically depicts an embodiment of an observation window.

FIG. 3 depicts a 5×5 window 300 with a center pixel 310 as the window origin ($p_{22}$), which is used in locating the window 300 about a given target pixel. The pixel values in the window are each denoted by some $p_{ij}$, where the subscripts i and j denote row and column indices respectively, and range from 0 to 4 for the 5×5 window. A circle 311 has been added as a quick visual indicator of the origin pixel location within the window. It is this origin pixel 310 which is typically stepped across all pixel address locations as each pixel location in turn becomes a target pixel. For each target pixel address, the pixel values within the window 300 are applied to the edge identification processing and enhancement as described above and below in the discussion of FIG. 2. While the discussion here of FIGS. 2 and 3 describes the edge identification process as a serial operation, where successive target pixels are defined and processed, it will also be recognized by one skilled in the art that a parallel process could be employed where multiple target pixels could be processed simultaneously using multiple windows and multiple edge identification processors. The bitmap image data may be divided-up in any number of ways in order to achieve this parallel processing of the image data. One approach for example would be using segmentation to divide the image data into text and graphics. Another approach for color images would be to separate out the color planes and process each individually. There are many other approaches that will be apparent to those skilled in the art.

Returning now to FIG. 2, in step 250 the extracted pixel values are used as input into the edge identification processing means 210. There are alternative computing architectures that may be employed here, such as parallel, serial, or some combination of parallel and serial operations, as will be evident to those skilled in the art. However the computing architecture is configured, the operations are low complexity arithmetic and look-up table operations applied to the extracted pixel values. The edge identification performed in step 250 is encoded to an edge identification code in step 260. The edge identification code may used in a step to generate an enhanced tinted edge 265, where enhanced tinted edge has different halftoning structure than the body of the tinted object. Finally, the increment block 270 restarts the process loop over at the next target pixel address until all target pixels have been processed.

Figure 4:
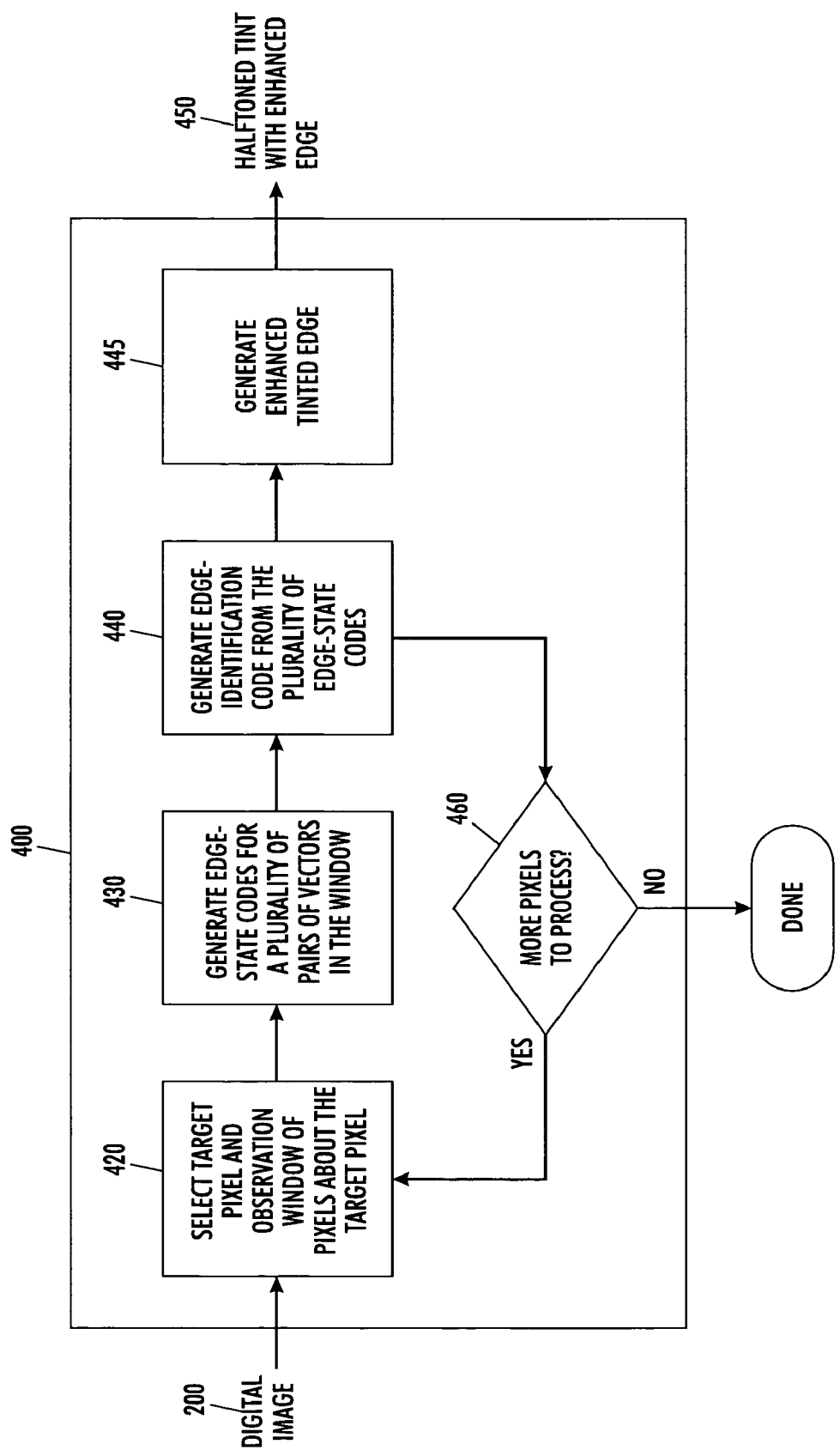
FIG. 4 is a generalized data flow representation of one embodiment of the teachings presented herein.

FIG. 4 depicts a flowchart wherein a digital image data 200 is input to edge-identification and tinted edge enhancement process 400. A target pixel is selected and an observation window of pixels is observed about the target pixel 420. Edge-state codes are generated for a plurality of pairs of vectors of pixels that run through the observation window 430. FIG. 3 depicts one arrangement of vectors of pixels that run through the observation window in horizontal 320 and vertical 330 orientations. Vectors of other orientation, such as diagonal, may be employed in generating edge-state codes. An edge-identification code is generated from the plurality of edge state codes 440 to produce an edge-identification code about the target pixel 450. A halftoning processes 445 uses the edge-identification code to direct the halftoning performed at the target pixel. If the edge-identification code indicates that the target pixel is at an appropriate distance from an edge, a halftoning process will be applied that is selected for enhanced edge rendering, as will be described below. If the edge-identification code indicates that the target pixel is not at an edge, a conventional halftoning process will be applied, where the conventional process is that process which is applied within the body of the tinted object. If more pixels are to be processed 460, the edge identification and edge enhancement process returns to step 420.

Figure 5:
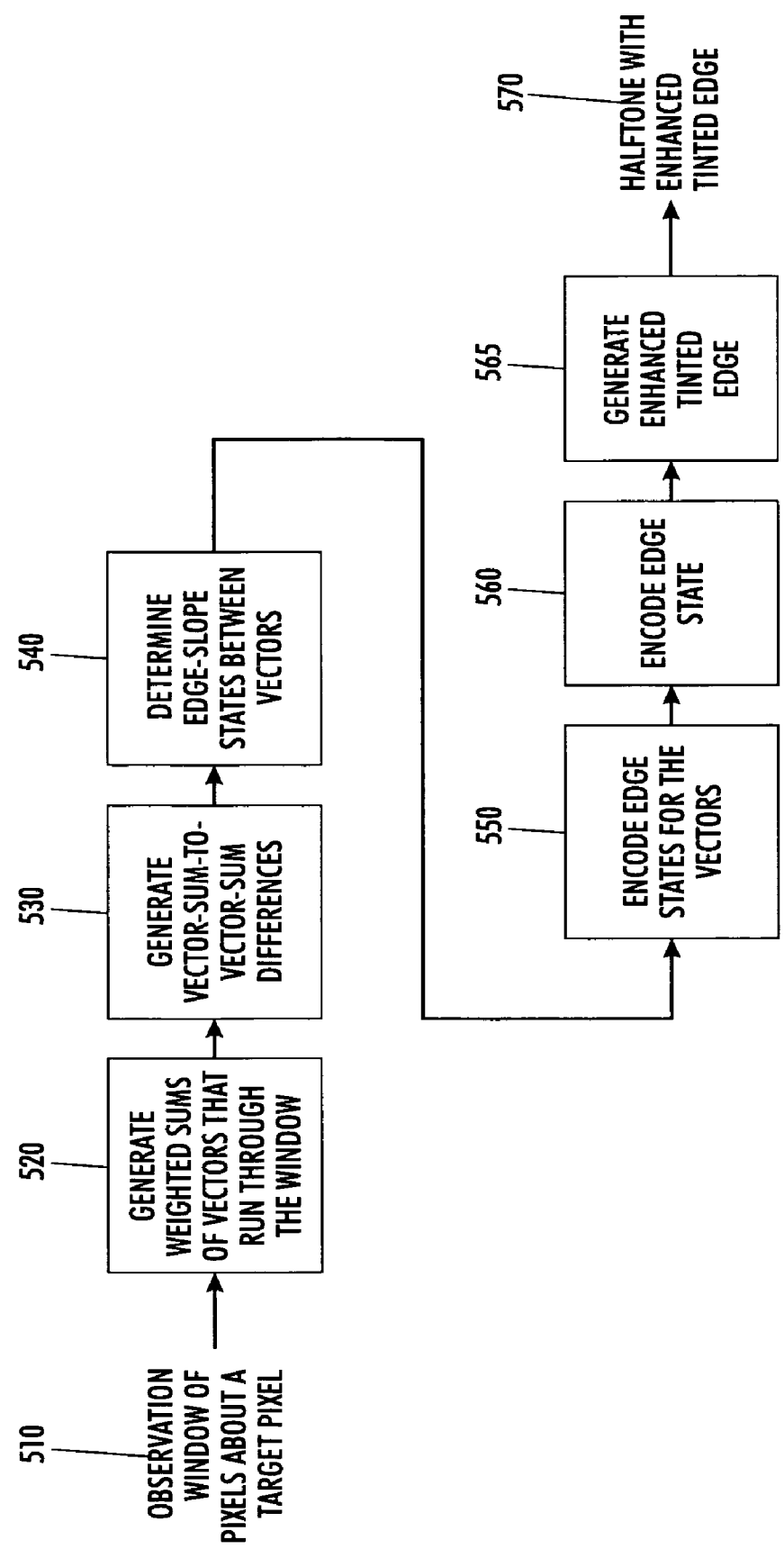
FIG. 5 is a generalized data flow representation of another embodiment of the teachings presented herein.

FIG. 5 depicts how an observation window of pixels 300 about a target pixel 310 is input 510 to step 520 where a plurality of sums of weighted pixel values are generated, where each sum is taken over a vector of pixels that run through the observation window. The weights can be applied as multiplicative coefficients, or another means, such as by an additive or subtractive operation. Step 530 receives the weighted sums of vectors of pixels, and generates vector-sum-to-vector-sum differences between pairs of neighboring vectors. For instance, when employing horizontal vectors 320 for pixel observation window rows 0 through 4, differences can be generated for the respective sums of row 0 and 1, the respective sums of rows 1 and 2, the respective sums of rows 2 and 3, and the respective sums of rows 3 and 4. Alternatively, differences may be taken between neighboring vectors other than the nearest neighboring vectors. For instance, differences can be generated for the respective sums of row 0 and 2, the respective sums of rows 1 and 3, and the respective sums of rows 2 and 4.

The vector-sum-to-vector-sum differences are input to step 540 where an "edge-slope state" between each of the plurality of vector pairs is determined. "Edge-slope state" refers to the presence of an edge and the orientation of the edge (rising or falling) between the vectors of pixels. Large differences between the sums indicate the presence of an edge, while positive and negative signs to the difference indicate a rising or falling edge, respectively. Step 550 receives the plurality of edge-slope states and encodes those states as a plurality of respective bit patterns. For instance, the presence or strength of an edge between two vectors of pixels may be encoded in some number of bits, and the sign, or orientation, of the edge may be encoded by another bit. For applications that do not require high precision definition of edges, it may be sufficient to encode the presence and strength of an edge in 1 bit, i.e., an edge is significantly present or an edge is not significantly present. For other applications requiring finer identification of edges, more than one bit may be used to define the presence and strength of an edge.

The plurality of edge states for the vectors generated in step 550 are input to an encoding process 560 that generates a code for the edge state of the plurality of vectors of the window. In other words, step 560 will receive a plurality of bit patterns, i.e., edge-state codes for the vector differences, and may employ a look-up table to map those bit patterns, to a bit pattern representing a general state of the edges for the plurality of vectors examined. For instance, an edge-state code about a target pixel may indicate rising and falling edges for multiple locations within the pixel observation window. The edge-state code is used in a halftoning processes 565 to direct the halftoning performed at the target pixel. If the edge-identification code indicates that the target pixel is at an appropriate distance from an edge, a halftoning process will be applied that is selected for enhanced edge rendering 570, as will be described below. If the edge-identification code indicates that the target pixel is not at an edge, a conventional halftoning process will be applied, where the conventional process is that process which is applied within the body of the tinted object.

Figure 6:
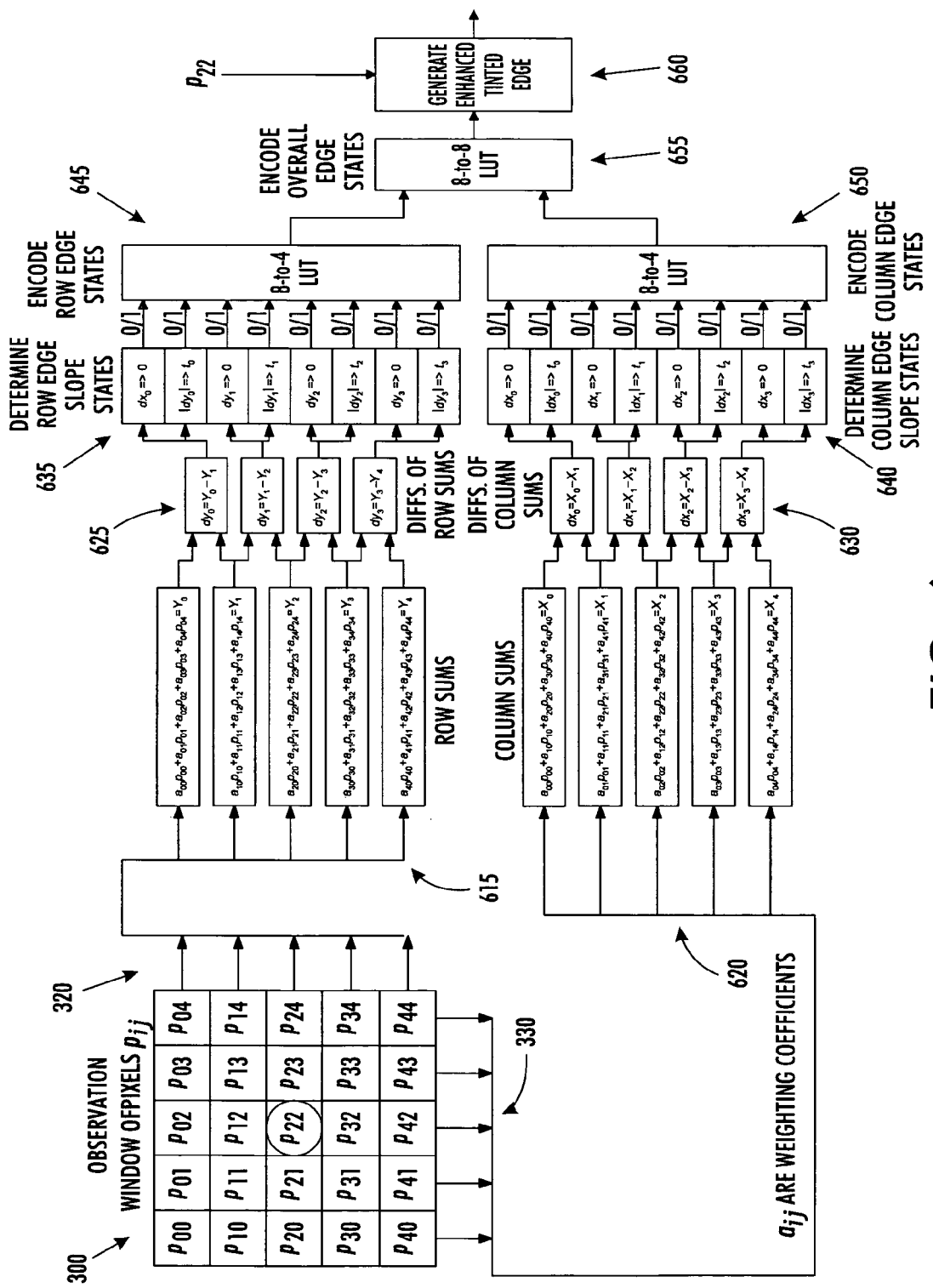
FIG. 6 is a schematic of an embodiment of the computing architecture of an embodiment of the teachings presented herein.

FIG. 6 depicts a detailed high-level block diagram schematic for one embodiment consistent with the teachings provided herein. An observation window of pixels 300 is shown with the window origin pixel denoted $p_{22}$. Pixels aligned in a particular orientation are used to form a plurality of vectors of pixels associated with that orientation. In FIG. 6, rows of pixels in the observation window are used to form respective horizontal vectors of pixels 320 and columns of pixels are used to form respective vertical vectors of pixels 330. As will be evident to those skilled in the art, other or additional vectors of pixels of other orientations may be formed from pixels in the observation window. For example, vectors of pixels may be formed from pixels aligned at some angle, such as ±45°.

In a next step, the plurality of vectors of pixels are received, and weighted sums of pixels within each vector are generated. FIG. 6 illustrates multiplicative weighting with weights $a_{ij}$ applied to the pixel values within a vector, whereupon the weighted values are summed. These weights $a_{ij}$ can be selected and optimized for particular applications. For instance, in the presence of background noise in the image, the weights may be made uniform (e.g., all 1's) in an attempt to suppress the effect of noise on the edge identification. Conversely, a low noise setting or in situations where images possess very small edge features it may be required to utilize larger values of weights $a_{ij}$ near the center of the window and smaller values at greater distance from the center. The values could decrease from a center value with a trend such as linear or Gaussian. The weighting and summing process is performed for each respective vector of each orientation. Summing blocks 615 in the present embodiment perform the summing process for the horizontal vectors and Summing blocks 620 perform the summing process for the vertical vectors. A plurality of sums are produced, denote by $Y_i$ for the horizontal vectors and $X_i$ for the vertical vectors, where i=0 to 4 in the presently illustrated embodiment.

In some computing architectures it can be advantageous to reduce the number of bits in the weighting and summing process. For instance, when using 8-bit numbers possessing range 0 to 255, and using multiplicative coefficients defined by 8 bits, the resultant product may require 16-bit representation. A sum over the vector of pixels would require an even higher bit representation. Using such a large number of bits to represent results of these intermediate operations can be very costly for real-time, high-speed applications. Further, typical edge identification tasks do not require such a great bit depth. It has been found that it is advantageous as to both cost and speed to reduce the bit depth of these operations. For instance, the weighted sums can be limited to 8 bits of quantization resolution.

In a subsequent step, the weighted vector sums are received and differences are formed between pairs of sums of neighboring vectors of a particular orientation. In FIG. 6, computational blocks 625 and 630 perform differencing for nearest-neighbor rows and nearest-neighbor columns, respectively, to form a plurality of vector-sum differences for each orientation. In FIG. 6, the differences are denoted as $dy_i$ for column vectors and $dx_i$ for row vectors, where i=0 to 3. As stated above, the difference step may not be restricted to nearest neighbors, and may be performed between neighboring vectors that are separated by one or more vectors.

In a further step, a plurality of edge-slope states between the vectors are generated using respective differences between vector sums as input. Determination of the edge-slope states depicted in FIG. 6 as performed by computational blocks 635 and 640 tests the magnitude and sign of each difference. For each difference, the significance of the edge is determined by comparing the magnitude of that difference to a threshold. A 1-bit output (states 0 or 1) indicates that the difference is at or above a threshold, thereby indicating significance, or is not at or above the threshold, thereby indicating lack of significance. The thresholds are depicted in FIG. 6 as $t_i$ where i=0 to 3. These thresholds may be set over a broad range of value and made the same or different for different vector pairs or different vector orientations depending on a particular application. For instance, thresholds may be set low (e.g., 16) when attempting to identify an edge of a gray object, such as a gray typographic character, and may be set high (e.g., 128) when attempting to identify a high contrast edge, like the corner of a black typographic character on a white background. The sign of each difference is also tested and the result is rendered to a 1-bit form indicating a positive or negative slope, where slope of zero could be classified either positive or negative due to the lack of significance of the edge. The edge-slope states are determined for row and column vectors, by computational blocks 635 and 640, respectively. A plurality of edge-slope states are determined for each orientation.

An edge encoding block for a given particular orientation receives the edge-slope state and generates a code for the edge state of that orientation. In FIG. 6, encoding blocks 645 and 650 provide the encoding of edge states for horizontal and vertical orientations, respectively. The encoding may in one embodiment be performed via a Look-Up Table (LUT) that maps the bits of the plurality of edge-slope states for an orientation to an orientation edge-state code. The FIG. 6 embodiment illustrates the use of an 8-bit-to-4-bit LUT for that encoding purpose, but it is within the scope of the invention to allow other bit mapping relationship. For instance, use of more vectors or high quantization of vector-sum differences could require more than 8 bits as input and 4 bits output. If only one orientation is employed, this orientation edge-state code is the resulting edge state code of the process. However, if more than one orientation of vectors is employed, the multiple orientation edge-state codes are mapped through an additional encoding process block 655 to arrive at output edge-state code. This encoding may also be performed using a LUT process as will be understood by those skilled in the art.

The edge-state code is used in a halftoning processes 660 to direct the halftoning performed at the target pixel. If the edge-identification code indicates that the target pixel is at an appropriate distance from an edge, a halftoning process will be applied that is selected for enhanced edge rendering, as will be described below. If the edge-identification code indicates that the target pixel is not at an edge, a conventional halftoning process will be applied, where the conventional process is that process which is applied within the body of the tinted object.

An example of a LUT for encoding edge states is given in Table 1. The codes are shown in the table as hexadecimal numbers. In Table 1, the notation used is in reference to horizontal vectors, but concepts embodied by the table are more general. For instance, it is straightforward to interpret the inputs to be from an orientation other than horizontal, such as vertical. Further, the table can be considered an example of a means to produce an orientation edge-state code, or an output edge-state code if only one orientation is to be employed. The notation used as edge state descriptions in Table 1 is explained in Table 2.

TABLE 1

Row Edge Encoding

| Edge Slope States | | | | | | | | | |
|---|---|---|---|---|---|---|---|---|---|
| $dY0 > 0$ 1 means falling edge | abs(dY0) > T 1 means strong edge | $dY1 > 0$ 1 means falling edge | abs(dY1) > T 1 means strong edge | $dY2 > 0$ 1 means falling edge | abs(dY2) > T 1 means strong edge | $dY3 > 0$ 1 means falling edge | abs(dY3) > T 1 means strong edge | Edge State Description | Edge State Code |
| 0 | 0 | 0 | 0 | 0 | 0 | 0 | 0 | Flat | 0x0E |
| 0 | 0 | 0 | 0 | 0 | 0 | 0 | 1 | ↑FB | 0x00 |
| 0 | 0 | 0 | 0 | 0 | 0 | 1 | 0 | Flat | 0x0E |
| 0 | 0 | 0 | 0 | 0 | 0 | 1 | 1 | ↓FB | 0x01 |
| 0 | 0 | 0 | 0 | 0 | 1 | 0 | 0 | ↑B | 0x04 |
| 0 | 0 | 0 | 0 | 0 | 1 | 0 | 1 | ↑B↑FB | 0x02 |
| 0 | 0 | 0 | 0 | 0 | 1 | 1 | 0 | ↑B | 0x04 |

TABLE 1-continued

Row Edge Encoding

Edge Slope States

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code |
|---|---|---|---|---|---|---|---|---|---|
| 0 | 0 | 0 | 0 | 0 | 0 | 1 | 1 | ↑B↓FB | 0x0F |
| 0 | 0 | 0 | 0 | 0 | 1 | 0 | 0 | Flat | 0x0E |
| 0 | 0 | 0 | 0 | 0 | 1 | 0 | 1 | ↑FB | 0x00 |
| 0 | 0 | 0 | 0 | 0 | 1 | 1 | 0 | Flat | 0x0E |
| 0 | 0 | 0 | 0 | 0 | 1 | 1 | 1 | ↓FB | 0x01 |
| 0 | 0 | 0 | 0 | 1 | 1 | 0 | 0 | ↓B | 0x05 |
| 0 | 0 | 0 | 0 | 1 | 1 | 0 | 1 | ↓B↑FB | 0x0F |
| 0 | 0 | 0 | 0 | 1 | 1 | 1 | 0 | ↓B | 0x05 |
| 0 | 0 | 0 | 0 | 1 | 1 | 1 | 1 | ↓B↓FB | 0x03 |
| 0 | 0 | 0 | 1 | 0 | 0 | 0 | 0 | ↑T | 0x08 |
| 0 | 0 | 0 | 1 | 0 | 0 | 0 | 1 | ↑T↑FB | 0x0F |
| 0 | 0 | 0 | 1 | 0 | 0 | 1 | 0 | ↑T | 0x08 |
| 0 | 0 | 0 | 1 | 0 | 0 | 1 | 1 | ↑T↓FB | 0x0F |
| 0 | 0 | 0 | 1 | 0 | 1 | 0 | 0 | ↑T↑B | 0x06 |
| 0 | 0 | 0 | 1 | 0 | 1 | 0 | 1 | ↑T↑B↑FB | 0x0F |
| 0 | 0 | 0 | 1 | 0 | 1 | 1 | 0 | ↑T↑B | 0x06 |
| 0 | 0 | 0 | 1 | 0 | 1 | 1 | 1 | ↑T↑B↓FB | 0x0F |
| 0 | 0 | 0 | 1 | 1 | 0 | 0 | 0 | ↑T | 0x08 |
| 0 | 0 | 0 | 1 | 1 | 0 | 0 | 1 | ↑T↑FB | 0x0F |
| 0 | 0 | 0 | 1 | 1 | 0 | 1 | 0 | ↑T | 0x08 |
| 0 | 0 | 0 | 1 | 1 | 0 | 1 | 1 | ↑T↓FB | 0x0F |
| 0 | 0 | 0 | 1 | 1 | 1 | 0 | 0 | ↑T↓B | 0x0F |
| 0 | 0 | 0 | 1 | 1 | 1 | 0 | 1 | ↑T↓B↑FB | 0x0F |
| 0 | 0 | 0 | 1 | 1 | 1 | 1 | 0 | ↑T↓B | 0x0F |
| 0 | 0 | 0 | 1 | 1 | 1 | 1 | 1 | ↑T↓B↓FB | 0x0F |
| 0 | 0 | 1 | 0 | 0 | 0 | 0 | 0 | Flat | 0x0E |
| 0 | 0 | 1 | 0 | 0 | 0 | 0 | 1 | ↑FB | 0x00 |
| 0 | 0 | 1 | 0 | 0 | 0 | 1 | 0 | Flat | 0x0E |
| 0 | 0 | 1 | 0 | 0 | 0 | 1 | 1 | ↓FB | 0x01 |
| 0 | 0 | 1 | 0 | 0 | 1 | 0 | 0 | ↑B | 0x04 |
| 0 | 0 | 1 | 0 | 0 | 1 | 0 | 1 | ↑B↑FB | 0x02 |
| 0 | 0 | 1 | 0 | 0 | 1 | 1 | 0 | ↑B | 0x04 |
| 0 | 0 | 1 | 0 | 0 | 1 | 1 | 1 | ↑B↓FB | 0x0F |
| 0 | 0 | 1 | 0 | 1 | 0 | 0 | 0 | Flat | 0x0E |
| 0 | 0 | 1 | 0 | 1 | 0 | 0 | 1 | ↑FB | 0x00 |
| 0 | 0 | 1 | 0 | 1 | 0 | 1 | 0 | Flat | 0x0E |
| 0 | 0 | 1 | 0 | 1 | 0 | 1 | 1 | ↓FB | 0x01 |
| 0 | 0 | 1 | 0 | 1 | 1 | 0 | 0 | ↓B | 0x05 |
| 0 | 0 | 1 | 0 | 1 | 1 | 0 | 1 | ↓B↑FB | 0x0F |
| 0 | 0 | 1 | 0 | 1 | 1 | 1 | 0 | ↓B | 0x05 |
| 0 | 0 | 1 | 0 | 1 | 1 | 1 | 1 | ↓B↓FB | 0x03 |
| 0 | 0 | 1 | 1 | 0 | 0 | 0 | 0 | ↓T | 0x09 |
| 0 | 0 | 1 | 1 | 0 | 0 | 0 | 1 | ↓T↑FB | 0x0F |
| 0 | 0 | 1 | 1 | 0 | 0 | 1 | 0 | ↓T | 0x09 |
| 0 | 0 | 1 | 1 | 0 | 0 | 1 | 1 | ↓T↓FB | 0x0F |
| 0 | 0 | 1 | 1 | 0 | 1 | 0 | 0 | ↓T↑B | 0x0F |
| 0 | 0 | 1 | 1 | 0 | 1 | 0 | 1 | ↓T↑B↑FB | 0x0F |
| 0 | 0 | 1 | 1 | 0 | 1 | 1 | 0 | ↓T↑B | 0x0F |
| 0 | 0 | 1 | 1 | 0 | 1 | 1 | 1 | ↓T↑B↓FB | 0x0F |
| 0 | 0 | 1 | 1 | 1 | 0 | 0 | 0 | ↓T | 0x09 |
| 0 | 0 | 1 | 1 | 1 | 0 | 0 | 1 | ↓T↑FB | 0x0F |
| 0 | 0 | 1 | 1 | 1 | 0 | 1 | 0 | ↓T | 0x09 |
| 0 | 0 | 1 | 1 | 1 | 0 | 1 | 1 | ↓T↓FB | 0x0F |
| 0 | 0 | 1 | 1 | 1 | 1 | 0 | 0 | ↓T↓B | 0x07 |
| 0 | 0 | 1 | 1 | 1 | 1 | 0 | 1 | ↓T↓B↑FB | 0x0F |
| 0 | 0 | 1 | 1 | 1 | 1 | 1 | 0 | ↓T↓B | 0x07 |
| 0 | 0 | 1 | 1 | 1 | 1 | 1 | 1 | ↓T↓B↓FB | 0x0F |
| 0 | 1 | 0 | 0 | 0 | 0 | 0 | 0 | ↑FT | 0x0C |
| 0 | 1 | 0 | 0 | 0 | 0 | 0 | 1 | ↑FT↑FB | 0x0F |
| 0 | 1 | 0 | 0 | 0 | 0 | 1 | 0 | ↑FT | 0x0C |
| 0 | 1 | 0 | 0 | 0 | 0 | 1 | 1 | ↑FT↓FB | 0x0F |
| 0 | 1 | 0 | 0 | 0 | 1 | 0 | 0 | ↑FT↑B | 0x0F |
| 0 | 1 | 0 | 0 | 0 | 1 | 0 | 1 | ↑FT↑B↑FB | 0x0F |
| 0 | 1 | 0 | 0 | 0 | 1 | 1 | 0 | ↑FT↑B | 0x0F |
| 0 | 1 | 0 | 0 | 0 | 1 | 1 | 1 | ↑FT↑B↓FB | 0x0F |
| 0 | 1 | 0 | 0 | 1 | 0 | 0 | 0 | ↑FT | 0x0C |
| 0 | 1 | 0 | 0 | 1 | 0 | 0 | 1 | ↑FT↑FB | 0x0F |
| 0 | 1 | 0 | 0 | 1 | 0 | 1 | 0 | ↑FT | 0x0C |
| 0 | 1 | 0 | 0 | 1 | 0 | 1 | 1 | ↑FT↓FB | 0x0F |

TABLE 1-continued

Row Edge Encoding

Edge Slope States

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code |
|---|---|---|---|---|---|---|---|---|---|
| 0 | 1 | 0 | 0 | 1 | 1 | 0 | 0 | ↑FT↓B | 0x0F |
| 0 | 1 | 0 | 0 | 1 | 1 | 0 | 1 | ↑FT↓B↑FB | 0x0F |
| 0 | 1 | 0 | 0 | 1 | 1 | 1 | 0 | ↑FT↓B | 0x0F |
| 0 | 1 | 0 | 0 | 1 | 1 | 1 | 1 | ↑FT↓B↓FB | 0x0F |
| 0 | 1 | 0 | 1 | 0 | 0 | 0 | 0 | ↑FT↑T | 0x0A |
| 0 | 1 | 0 | 1 | 0 | 0 | 0 | 1 | ↑FT↑T↑FB | 0x0F |
| 0 | 1 | 0 | 1 | 0 | 0 | 1 | 0 | ↑FT↑T | 0x0A |
| 0 | 1 | 0 | 1 | 0 | 0 | 1 | 1 | ↑FT↑T↓FB | 0x0F |
| 0 | 1 | 0 | 1 | 0 | 1 | 0 | 0 | ↑FT↑T↑B | 0x0F |
| 0 | 1 | 0 | 1 | 0 | 1 | 0 | 1 | ↑FT↑T↑B↑FB | 0x0F |
| 0 | 1 | 0 | 1 | 0 | 1 | 1 | 0 | ↑FT↑T↑B | 0x0F |
| 0 | 1 | 0 | 1 | 0 | 1 | 1 | 1 | ↑↑FT↑T↑B↓FB | 0x0F |
| 0 | 1 | 0 | 1 | 1 | 0 | 0 | 0 | ↑FT↑T | 0x0A |
| 0 | 1 | 0 | 1 | 1 | 0 | 0 | 1 | ↑FT↑T↑FB | 0x0F |
| 0 | 1 | 0 | 1 | 1 | 0 | 1 | 0 | ↑FT↑T | 0x0A |
| 0 | 1 | 0 | 1 | 1 | 0 | 1 | 1 | ↑FT↑T↓FB | 0x0F |
| 0 | 1 | 0 | 1 | 1 | 1 | 0 | 0 | ↑FT↑T↓B | 0x0F |
| 0 | 1 | 0 | 1 | 1 | 1 | 0 | 1 | ↑FT↑T↓B↑FB | 0x0F |
| 0 | 1 | 0 | 1 | 1 | 1 | 1 | 0 | ↑FT↑T↓B | 0x0F |
| 0 | 1 | 0 | 1 | 1 | 1 | 1 | 1 | ↑FT↑T↓B↓FB | 0x0F |
| 0 | 1 | 1 | 0 | 0 | 0 | 0 | 0 | ↑FT | 0x0C |
| 0 | 1 | 1 | 0 | 0 | 0 | 0 | 1 | ↑FT↑FB | 0x0F |
| 0 | 1 | 1 | 0 | 0 | 0 | 1 | 0 | ↑FT | 0x0C |
| 0 | 1 | 1 | 0 | 0 | 0 | 1 | 1 | ↑FT↓FB | 0x0F |
| 0 | 1 | 1 | 0 | 0 | 1 | 0 | 0 | ↑FT↑B | 0x0F |
| 0 | 1 | 1 | 0 | 0 | 1 | 0 | 1 | ↑FT↑B↑FB | 0x0F |
| 0 | 1 | 1 | 0 | 0 | 1 | 1 | 0 | ↑FT↑B | 0x0F |
| 0 | 1 | 1 | 0 | 0 | 1 | 1 | 1 | ↑FT↑B↓FB | 0x0F |
| 0 | 1 | 1 | 0 | 1 | 0 | 0 | 0 | ↑FT | 0x0C |
| 0 | 1 | 1 | 0 | 1 | 0 | 0 | 1 | ↑FT↑FB | 0x0F |
| 0 | 1 | 1 | 0 | 1 | 0 | 1 | 0 | ↑FT | 0x0C |
| 0 | 1 | 1 | 0 | 1 | 0 | 1 | 1 | ↑FT↓FB | 0x0F |
| 0 | 1 | 1 | 0 | 1 | 1 | 0 | 0 | ↑FT↓B | 0x0F |
| 0 | 1 | 1 | 0 | 1 | 1 | 0 | 1 | ↑FT↓B↑FB | 0x0F |
| 0 | 1 | 1 | 0 | 1 | 1 | 1 | 0 | ↑FT↓B | 0x0F |
| 0 | 1 | 1 | 0 | 1 | 1 | 1 | 1 | ↑FT↓B↓FB | 0x0F |
| 0 | 1 | 1 | 1 | 0 | 0 | 0 | 0 | ↑FT↓T | 0x0F |
| 0 | 1 | 1 | 1 | 0 | 0 | 0 | 1 | ↑FT↓T↑FB | 0x0F |
| 0 | 1 | 1 | 1 | 0 | 0 | 1 | 0 | ↑FT↓T | 0x0F |
| 0 | 1 | 1 | 1 | 0 | 0 | 1 | 1 | ↑FT↓T↓FB | 0x0F |
| 0 | 1 | 1 | 1 | 0 | 1 | 0 | 0 | ↑FT↓T↑B | 0x0F |
| 0 | 1 | 1 | 1 | 0 | 1 | 0 | 1 | ↑FT↓T↑B↑FB | 0x0F |
| 0 | 1 | 1 | 1 | 0 | 1 | 1 | 0 | ↑FT↓T↑B | 0x0F |
| 0 | 1 | 1 | 1 | 0 | 1 | 1 | 1 | ↑FT↓T↑B↓FB | 0x0F |
| 0 | 1 | 1 | 1 | 1 | 0 | 0 | 0 | ↑FT↓T | 0x0F |
| 0 | 1 | 1 | 1 | 1 | 0 | 0 | 1 | ↑FT↓T↑FB | 0x0F |
| 0 | 1 | 1 | 1 | 1 | 0 | 1 | 0 | ↑FT↓T | 0x0F |
| 0 | 1 | 1 | 1 | 1 | 0 | 1 | 1 | ↑FT↓T↓FB | 0x0F |
| 0 | 1 | 1 | 1 | 1 | 1 | 0 | 0 | ↑FT↓T↓B | 0x0F |
| 0 | 1 | 1 | 1 | 1 | 1 | 0 | 1 | ↑FT↓T↓B↑FB | 0x0F |
| 0 | 1 | 1 | 1 | 1 | 1 | 1 | 0 | ↑FT↓T↓B | 0x0F |
| 0 | 1 | 1 | 1 | 1 | 1 | 1 | 1 | ↑FT↓T↓B↓FB | 0x0F |
| 1 | 0 | 0 | 0 | 0 | 0 | 0 | 0 | Flat | 0x0E |
| 1 | 0 | 0 | 0 | 0 | 0 | 0 | 1 | ↑FB | 0x00 |
| 1 | 0 | 0 | 0 | 0 | 0 | 1 | 0 | Flat | 0x0E |
| 1 | 0 | 0 | 0 | 0 | 0 | 1 | 1 | ↓FB | 0x01 |
| 1 | 0 | 0 | 0 | 0 | 1 | 0 | 0 | ↑B | 0x04 |
| 1 | 0 | 0 | 0 | 0 | 1 | 0 | 1 | ↑B↑FB | 0x02 |
| 1 | 0 | 0 | 0 | 0 | 1 | 1 | 0 | ↑B | 0x04 |
| 1 | 0 | 0 | 0 | 0 | 1 | 1 | 1 | ↑B↓FB | 0x0F |
| 1 | 0 | 0 | 0 | 1 | 0 | 0 | 0 | Flat | 0x0E |
| 1 | 0 | 0 | 0 | 1 | 0 | 0 | 1 | ↑FB | 0x00 |
| 1 | 0 | 0 | 0 | 1 | 0 | 1 | 0 | Flat | 0x0E |
| 1 | 0 | 0 | 0 | 1 | 0 | 1 | 1 | ↓FB | 0x01 |
| 1 | 0 | 0 | 0 | 1 | 1 | 0 | 0 | ↓B | 0x05 |
| 1 | 0 | 0 | 0 | 1 | 1 | 0 | 1 | ↓B↑FB | 0x0F |
| 1 | 0 | 0 | 0 | 1 | 1 | 1 | 0 | ↓B | 0x05 |
| 1 | 0 | 0 | 0 | 1 | 1 | 1 | 1 | ↓B↓FB | 0x03 |
| 1 | 0 | 0 | 1 | 0 | 0 | 0 | 0 | ↑T | 0x08 |

TABLE 1-continued

Row Edge Encoding

Edge Slope States

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code |
|---|---|---|---|---|---|---|---|---|---|
| 1 | 0 | 0 | 1 | 0 | 0 | 0 | 1 | ↑T↑FB | 0x0F |
| 1 | 0 | 0 | 1 | 0 | 0 | 1 | 0 | ↑T | 0x08 |
| 1 | 0 | 0 | 1 | 0 | 0 | 1 | 1 | ↑T↓FB | 0x0F |
| 1 | 0 | 0 | 1 | 0 | 1 | 0 | 0 | ↑T↑B | 0x06 |
| 1 | 0 | 0 | 1 | 0 | 1 | 0 | 1 | ↑T↑B↑FB | 0x0F |
| 1 | 0 | 0 | 1 | 0 | 1 | 1 | 0 | ↑T↑B | 0x06 |
| 1 | 0 | 0 | 1 | 0 | 1 | 1 | 1 | ↑T↑B↓FB | 0x0F |
| 1 | 0 | 0 | 1 | 1 | 0 | 0 | 0 | ↑T | 0x08 |
| 1 | 0 | 0 | 1 | 1 | 0 | 0 | 1 | ↑T↑FB | 0x0F |
| 1 | 0 | 0 | 1 | 1 | 0 | 1 | 0 | ↑T | 0x08 |
| 1 | 0 | 0 | 1 | 1 | 0 | 1 | 1 | ↑T↓FB | 0x0F |
| 1 | 0 | 0 | 1 | 1 | 1 | 0 | 0 | ↑T↓B↑FB | 0x0F |
| 1 | 0 | 0 | 1 | 1 | 1 | 0 | 1 | ↑T↓FB | 0x0F |
| 1 | 0 | 0 | 1 | 1 | 1 | 1 | 0 | ↑T↓B | 0x0F |
| 1 | 0 | 0 | 1 | 1 | 1 | 1 | 1 | ↑T↓B↓FB | 0x0F |
| 1 | 0 | 1 | 0 | 0 | 0 | 0 | 0 | Flat | 0x0E |
| 1 | 0 | 1 | 0 | 0 | 0 | 0 | 1 | ↑FB | 0x00 |
| 1 | 0 | 1 | 0 | 0 | 0 | 1 | 0 | Flat | 0x0E |
| 1 | 0 | 1 | 0 | 0 | 0 | 1 | 1 | ↓FB | 0x01 |
| 1 | 0 | 1 | 0 | 0 | 1 | 0 | 0 | ↑B | 0x04 |
| 1 | 0 | 1 | 0 | 0 | 1 | 0 | 1 | ↑B↑FB | 0x02 |
| 1 | 0 | 1 | 0 | 0 | 1 | 1 | 0 | ↑B | 0x04 |
| 1 | 0 | 1 | 0 | 0 | 1 | 1 | 1 | ↑B↓FB | 0x0F |
| 1 | 0 | 1 | 0 | 1 | 0 | 0 | 0 | Flat | 0x0E |
| 1 | 0 | 1 | 0 | 1 | 0 | 0 | 1 | ↑FB | 0x00 |
| 1 | 0 | 1 | 0 | 1 | 0 | 1 | 0 | Flat | 0x0E |
| 1 | 0 | 1 | 0 | 1 | 0 | 1 | 1 | ↓FB | 0x01 |
| 1 | 0 | 1 | 0 | 1 | 1 | 0 | 0 | ↓B | 0x05 |
| 1 | 0 | 1 | 0 | 1 | 1 | 0 | 1 | ↓B↑FB | 0x0F |
| 1 | 0 | 1 | 0 | 1 | 1 | 1 | 0 | ↓B | 0x05 |
| 1 | 0 | 1 | 0 | 1 | 1 | 1 | 1 | ↓B↓FB | 0x03 |
| 1 | 0 | 1 | 1 | 0 | 0 | 0 | 0 | ↓T | 0x09 |
| 1 | 0 | 1 | 1 | 0 | 0 | 0 | 1 | ↓T↑FB | 0x0F |
| 1 | 0 | 1 | 1 | 0 | 0 | 1 | 0 | ↓T | 0x09 |
| 1 | 0 | 1 | 1 | 0 | 0 | 1 | 1 | ↓T↓FB | 0x0F |
| 1 | 0 | 1 | 1 | 0 | 1 | 0 | 0 | ↓T↑B | 0x0F |
| 1 | 0 | 1 | 1 | 0 | 1 | 0 | 1 | ↓T↑B↑FB | 0x0F |
| 1 | 0 | 1 | 1 | 0 | 1 | 1 | 0 | ↓T↑B | 0x0F |
| 1 | 0 | 1 | 1 | 0 | 1 | 1 | 1 | ↓T↑B↓FB | 0x0F |
| 1 | 0 | 1 | 1 | 1 | 0 | 0 | 0 | ↓T | 0x09 |
| 1 | 0 | 1 | 1 | 1 | 0 | 0 | 1 | ↓T↑FB | 0x0F |
| 1 | 0 | 1 | 1 | 1 | 0 | 1 | 0 | ↓T | 0x09 |
| 1 | 0 | 1 | 1 | 1 | 0 | 1 | 1 | ↓T↓FB | 0x0F |
| 1 | 0 | 1 | 1 | 1 | 1 | 0 | 0 | ↓T↓B | 0x07 |
| 1 | 0 | 1 | 1 | 1 | 1 | 0 | 1 | ↓T↓B↑FB | 0x0F |
| 1 | 0 | 1 | 1 | 1 | 1 | 1 | 0 | ↓T↓B | 0x07 |
| 1 | 0 | 1 | 1 | 1 | 1 | 1 | 1 | ↓T↓B↓FB | 0x0F |
| 1 | 1 | 0 | 0 | 0 | 0 | 0 | 0 | ↓FT | 0x0D |
| 1 | 1 | 0 | 0 | 0 | 0 | 0 | 1 | ↓FT↑FB | 0x0F |
| 1 | 1 | 0 | 0 | 0 | 0 | 1 | 0 | ↓FT | 0x0D |
| 1 | 1 | 0 | 0 | 0 | 0 | 1 | 1 | ↓FT↓FB | 0x0F |
| 1 | 1 | 0 | 0 | 0 | 1 | 0 | 0 | ↓FT↑B | 0x0F |
| 1 | 1 | 0 | 0 | 0 | 1 | 0 | 1 | ↓FT↑B↑FB | 0x0F |
| 1 | 1 | 0 | 0 | 0 | 1 | 1 | 0 | ↓FT↑B | 0x0F |
| 1 | 1 | 0 | 0 | 0 | 1 | 1 | 1 | ↓FT↑B↓FB | 0x0F |
| 1 | 1 | 0 | 0 | 1 | 0 | 0 | 0 | ↓FT | 0x0D |
| 1 | 1 | 0 | 0 | 1 | 0 | 0 | 1 | ↓FT↑FB | 0x0F |
| 1 | 1 | 0 | 0 | 1 | 0 | 1 | 0 | ↓FT | 0x0D |
| 1 | 1 | 0 | 0 | 1 | 0 | 1 | 1 | ↓FT↓FB | 0x0F |
| 1 | 1 | 0 | 0 | 1 | 1 | 0 | 0 | ↓FT↓B | 0x0F |
| 1 | 1 | 0 | 0 | 1 | 1 | 0 | 1 | ↓FT↓B↑FB | 0x0F |
| 1 | 1 | 0 | 0 | 1 | 1 | 1 | 0 | ↓FT↓B | 0x0F |
| 1 | 1 | 0 | 0 | 1 | 1 | 1 | 1 | ↓FT↓B↓FB | 0x0F |
| 1 | 1 | 0 | 1 | 0 | 0 | 0 | 0 | ↓FT↑T | 0x0F |
| 1 | 1 | 0 | 1 | 0 | 0 | 0 | 1 | ↓FT↑T↑FB | 0x0F |
| 1 | 1 | 0 | 1 | 0 | 0 | 1 | 0 | ↓FT↑T | 0x0F |
| 1 | 1 | 0 | 1 | 0 | 0 | 1 | 1 | ↓FT↑T↑FB | 0x0F |
| 1 | 1 | 0 | 1 | 0 | 1 | 0 | 0 | ↓FT↑T↑B | 0x0F |
| 1 | 1 | 0 | 1 | 0 | 1 | 0 | 1 | ↓FT↑T↑B↑FB | 0x0F |

TABLE 1-continued

Row Edge Encoding

Edge Slope States

| dY0 > 0 1 means falling edge | abs(dY0) > T 1 means strong edge | dY1 > 0 1 means falling edge | abs(dY1) > T 1 means strong edge | dY2 > 0 1 means falling edge | abs(dY2) > T 1 means strong edge | dY3 > 0 1 means falling edge | abs(dY3) > T 1 means strong edge | Edge State Description | Edge State Code |
|---|---|---|---|---|---|---|---|---|---|
| 1 | 1 | 0 | 1 | 0 | 1 | 1 | 0 | ↓FT↑T↑B | 0x0F |
| 1 | 1 | 0 | 1 | 0 | 1 | 1 | 1 | ↓FT↑T↑B↓FB | 0x0F |
| 1 | 1 | 0 | 1 | 1 | 0 | 0 | 0 | ↓FT↑T | 0x0F |
| 1 | 1 | 0 | 1 | 1 | 0 | 0 | 1 | ↓FT↑T↑FB | 0x0F |
| 1 | 1 | 0 | 1 | 1 | 0 | 1 | 0 | ↓FT↑T | 0x0F |
| 1 | 1 | 0 | 1 | 1 | 0 | 1 | 1 | ↓FT↑T↓FB | 0x0F |
| 1 | 1 | 0 | 1 | 1 | 1 | 0 | 0 | ↓FT↑T↓B | 0x0F |
| 1 | 1 | 0 | 1 | 1 | 1 | 0 | 1 | ↓FT↑T↓B↑FB | 0x0F |
| 1 | 1 | 0 | 1 | 1 | 1 | 1 | 0 | ↓FT↑T↓B | 0x0F |
| 1 | 1 | 0 | 1 | 1 | 1 | 1 | 1 | ↓FT↑T↓B↓FB | 0x0F |
| 1 | 1 | 1 | 0 | 0 | 0 | 0 | 0 | ↓FT | 0x0D |
| 1 | 1 | 1 | 0 | 0 | 0 | 0 | 1 | ↓FT↑FB | 0x0F |
| 1 | 1 | 1 | 0 | 0 | 0 | 1 | 0 | ↓FT | 0x0D |
| 1 | 1 | 1 | 0 | 0 | 0 | 1 | 1 | ↓FT↓FB | 0x0F |
| 1 | 1 | 1 | 0 | 0 | 1 | 0 | 0 | ↓FT↑B | 0x0F |
| 1 | 1 | 1 | 0 | 0 | 1 | 0 | 1 | ↓FT↑B↑FB | 0x0F |
| 1 | 1 | 1 | 0 | 0 | 1 | 1 | 0 | ↓FT↑B | 0x0F |
| 1 | 1 | 1 | 0 | 0 | 1 | 1 | 1 | ↓FT↑B↓FB | 0x0F |
| 1 | 1 | 1 | 0 | 1 | 0 | 0 | 0 | ↓FT | 0x0D |
| 1 | 1 | 1 | 0 | 1 | 0 | 0 | 1 | ↓FT↑FB | 0x0F |
| 1 | 1 | 1 | 0 | 1 | 0 | 1 | 0 | ↓FT | 0x0D |
| 1 | 1 | 1 | 0 | 1 | 0 | 1 | 1 | ↓FT↓FB | 0x0F |
| 1 | 1 | 1 | 0 | 1 | 1 | 0 | 0 | ↓FT↓B | 0x0F |
| 1 | 1 | 1 | 0 | 1 | 1 | 0 | 1 | ↓FT↓B↑FB | 0x0F |
| 1 | 1 | 1 | 0 | 1 | 1 | 1 | 0 | ↓FT↓B | 0x0F |
| 1 | 1 | 1 | 0 | 1 | 1 | 1 | 1 | ↓FT↓B↓FB | 0x0F |
| 1 | 1 | 1 | 1 | 0 | 0 | 0 | 0 | ↓FT↓T | 0x0B |
| 1 | 1 | 1 | 1 | 0 | 0 | 0 | 1 | ↓FT↓T↑FB | 0x0F |
| 1 | 1 | 1 | 1 | 0 | 0 | 1 | 0 | ↓FT↓T | 0x0B |
| 1 | 1 | 1 | 1 | 0 | 0 | 1 | 1 | ↓FT↓T↓FB | 0x0F |
| 1 | 1 | 1 | 1 | 0 | 1 | 0 | 0 | ↓FT↓T↑B | 0x0F |
| 1 | 1 | 1 | 1 | 0 | 1 | 0 | 1 | ↓FT↓T↑B↑FB | 0x0F |
| 1 | 1 | 1 | 1 | 0 | 1 | 1 | 0 | ↓FT↓T↑B | 0x0F |
| 1 | 1 | 1 | 1 | 0 | 1 | 1 | 1 | ↓FT↓T↑B↓FB | 0x0F |
| 1 | 1 | 1 | 1 | 1 | 0 | 0 | 0 | ↓FT↓T | 0x0B |
| 1 | 1 | 1 | 1 | 1 | 0 | 0 | 1 | ↓FT↓T↑FB | 0x0F |
| 1 | 1 | 1 | 1 | 1 | 0 | 1 | 0 | ↓FT↓T | 0x0B |
| 1 | 1 | 1 | 1 | 1 | 0 | 1 | 1 | ↓FT↓T↓FB | 0x0F |
| 1 | 1 | 1 | 1 | 1 | 1 | 0 | 0 | ↓FT↓T↓B | 0x0F |
| 1 | 1 | 1 | 1 | 1 | 1 | 0 | 1 | ↓FT↓T↓B↑FB | 0x0F |
| 1 | 1 | 1 | 1 | 1 | 1 | 1 | 0 | ↓FT↓T↓B | 0x0F |
| 1 | 1 | 1 | 1 | 1 | 1 | 1 | 1 | ↓FT↓T↓B↓FB | 0x0F |

TABLE 2

Notation used in Table 1.

| Notation | Meaning |
|---|---|
| FT | Far Top, indicates a significant edge between rows 0 and 1 |
| T | Top, indicates a significant edge between row 1 and 2 |
| B | Bottom, indicates a significant edge between rows 2 and 3 |
| FB | Far Bottom, indicates a significant edge between rows 3 and 4 |
| ↑ | indicates edge slope increases in the direction of increasing row number |
| ↓ | indicates edge slope decreases in the direction of increasing row number |
| Flat | Flat, indicates absence of a significant edge |

To understand the codes used in the table consider the following examples. The edge state description ↑B↑FB having code 0x02 refers to a significant increasing-value edge between rows 2 and 3 and a significant increasing-value edge between rows 3 and 4. ↑T↓B↓FB having code 0x00 refers to a significant increasing edge between rows 1 and 2, a significant decreasing edge between rows 2 and 3, and a significant decreasing edge between rows 3 and 4. Since each of FT, T, B, and FB can be in one of 3 states in this table (increasing, decreasing, not significant), 81 states are possible requiring 7 bits of coding. Practically, not all of these states are important to real edge-identification applications. It has been found that 4 to 6 bits can encode the useful states for most applications. Table 1 provides a 4-bit example.

As stated above, more than one orientation of vectors may be employed, and the multiple orientation edge-state codes can be mapped at block 655 through an additional encoding process to arrive at an output edge-state code. To understand the multiple orientation aspect of this embodiment of the invention, consider the application of finding a corner pixel. In particular, assume that we wish to indicate that a corner covers pixels $p_{33}$, $p_{34}$, $p_{43}$, $p_{44}$, and the edge identification processor is employing horizontal vectors (rows) and vertical vectors (columns). The definition of the vertical edge states are analogous to the horizontal states, with FL (Far Left), L (Left), Right (Right), FR (Far Right) being analogous to FT, T, B, FB respectively. A corner covering $p_{33}$, $p_{34}$, $p_{43}$, $p_{44}$ would result in the codes for ↑B (0x04) and ↑R (0x04), from the row-edge encoding table and the column edge-encoding table, respectively. When these two codes are received by an encoder for multiple orientations, a code would be generated for the $p_{33}$-$p_{34}$-$p_{43}$-$p_{44}$-type corner. An example of a table for encoding an overall edge state from orientation edge states is given below in Table 3. In this example, the table coverts 4 bits from the horizontal codes and 4 bits from the vertical codes to 8 bits for an overall edge state code. Due to the equality of input and output bits in this example, the table can be rather straightforward, in that we can construct the output as a concatenation of the input bits.

TABLE 3

An example of a table encoding an overall edge state from orientation edge states.

| Horizontal Edge State Code | Vertical Edge State Code | Overall Edge State Code |
| --- | --- | --- |
| 0x00 | 0x00 | 0x00 |
| 0x00 | 0x01 | 0x01 |
| 0x00 | 0x02 | 0x02 |
| 0x00 | 0x03 | 0x03 |
| 0x00 | 0x04 | 0x04 |
| 0x00 | 0x05 | 0x05 |
| 0x00 | 0x06 | 0x06 |
| 0x00 | 0x07 | 0x07 |
| 0x00 | 0x08 | 0x08 |
| 0x00 | 0x09 | 0x09 |
| 0x00 | 0x0A | 0x0A |
| 0x00 | 0x0B | 0x0B |
| 0x00 | 0x0C | 0x0C |
| 0x00 | 0x0D | 0x0D |
| 0x00 | 0x0E | 0x0E |
| 0x00 | 0x0F | 0x0F |
| 0x01 | 0x00 | 0x10 |
| 0x01 | 0x01 | 0x11 |
| 0x01 | 0x02 | 0x12 |
| 0x01 | 0x03 | 0x13 |
| 0x01 | 0x04 | 0x14 |
| 0x01 | 0x05 | 0x15 |
| 0x01 | 0x06 | 0x16 |
| 0x01 | 0x07 | 0x17 |
| 0x01 | 0x08 | 0x18 |
| 0x01 | 0x09 | 0x19 |
| 0x01 | 0x0A | 0x1A |
| 0x01 | 0x0B | 0x1B |
| 0x01 | 0x0C | 0x1C |
| 0x01 | 0x0D | 0x1D |
| 0x01 | 0x0E | 0x1E |
| 0x01 | 0x0F | 0x1F |
| 0x02 | 0x00 | 0x20 |
| 0x02 | 0x01 | 0x21 |
| 0x02 | 0x02 | 0x22 |
| 0x02 | 0x03 | 0x23 |
| 0x02 | 0x04 | 0x24 |
| 0x02 | 0x05 | 0x25 |
| 0x02 | 0x06 | 0x26 |
| 0x02 | 0x07 | 0x27 |
| 0x02 | 0x08 | 0x28 |
| 0x02 | 0x09 | 0x29 |
| 0x02 | 0x0A | 0x2A |
| 0x02 | 0x0B | 0x2B |
| 0x02 | 0x0C | 0x2C |
| 0x02 | 0x0D | 0x2D |
| 0x02 | 0x0E | 0x2E |
| 0x02 | 0x0F | 0x2F |
| 0x03 | 0x00 | 0x30 |
| 0x03 | 0x01 | 0x31 |
| 0x03 | 0x02 | 0x32 |
| 0x03 | 0x03 | 0x33 |
| 0x03 | 0x04 | 0x34 |
| 0x03 | 0x05 | 0x35 |
| 0x03 | 0x06 | 0x36 |
| 0x03 | 0x07 | 0x37 |
| 0x03 | 0x08 | 0x38 |
| 0x03 | 0x09 | 0x39 |
| 0x03 | 0x0A | 0x3A |
| 0x03 | 0x0B | 0x3B |
| 0x03 | 0x0C | 0x3C |
| 0x03 | 0x0D | 0x3D |
| 0x03 | 0x0E | 0x3E |
| 0x03 | 0x0F | 0x3F |
| 0x04 | 0x00 | 0x40 |
| 0x04 | 0x01 | 0x41 |
| 0x04 | 0x02 | 0x42 |
| 0x04 | 0x03 | 0x43 |
| 0x04 | 0x04 | 0x44 |
| 0x04 | 0x05 | 0x45 |
| 0x04 | 0x06 | 0x46 |
| 0x04 | 0x07 | 0x47 |
| 0x04 | 0x08 | 0x48 |
| 0x04 | 0x09 | 0x49 |
| 0x04 | 0x0A | 0x4A |
| 0x04 | 0x0B | 0x4B |
| 0x04 | 0x0C | 0x4C |
| 0x04 | 0x0D | 0x4D |
| 0x04 | 0x0E | 0x4E |
| 0x04 | 0x0F | 0x4F |
| 0x05 | 0x00 | 0x50 |
| 0x05 | 0x01 | 0x51 |
| 0x05 | 0x02 | 0x52 |
| 0x05 | 0x03 | 0x53 |
| 0x05 | 0x04 | 0x54 |
| 0x05 | 0x05 | 0x55 |
| 0x05 | 0x06 | 0x56 |
| 0x05 | 0x07 | 0x57 |
| 0x05 | 0x08 | 0x58 |
| 0x05 | 0x09 | 0x59 |
| 0x05 | 0x0A | 0x5A |
| 0x05 | 0x0B | 0x5B |
| 0x05 | 0x0C | 0x5C |
| 0x05 | 0x0D | 0x5D |
| 0x05 | 0x0E | 0x5E |
| 0x05 | 0x0F | 0x5F |
| 0x06 | 0x00 | 0x60 |
| 0x06 | 0x01 | 0x61 |
| 0x06 | 0x02 | 0x62 |
| 0x06 | 0x03 | 0x63 |
| 0x06 | 0x04 | 0x64 |
| 0x06 | 0x05 | 0x65 |
| 0x06 | 0x06 | 0x66 |
| 0x06 | 0x07 | 0x67 |
| 0x06 | 0x08 | 0x68 |
| 0x06 | 0x09 | 0x69 |
| 0x06 | 0x0A | 0x6A |
| 0x06 | 0x0B | 0x6B |
| 0x06 | 0x0C | 0x6C |
| 0x06 | 0x0D | 0x6D |
| 0x06 | 0x0E | 0x6E |
| 0x06 | 0x0F | 0x6F |
| 0x07 | 0x00 | 0x70 |
| 0x07 | 0x01 | 0x71 |
| 0x07 | 0x02 | 0x72 |
| 0x07 | 0x03 | 0x73 |
| 0x07 | 0x04 | 0x74 |
| 0x07 | 0x05 | 0x75 |
| 0x07 | 0x06 | 0x76 |
| 0x07 | 0x07 | 0x77 |
| 0x07 | 0x08 | 0x78 |
| 0x07 | 0x09 | 0x79 |
| 0x07 | 0x0A | 0x7A |
| 0x07 | 0x0B | 0x7B |
| 0x07 | 0x0C | 0x7C |
| 0x07 | 0x0D | 0x7D |
| 0x07 | 0x0E | 0x7E |
| 0x07 | 0x0F | 0x7F |

TABLE 3-continued

An example of a table encoding an overall edge state from orientation edge states.

| Horizontal Edge State Code | Vertical Edge State Code | Overall Edge State Code |
|---|---|---|
| 0x08 | 0x00 | 0x80 |
| 0x08 | 0x01 | 0x81 |
| 0x08 | 0x02 | 0x82 |
| 0x08 | 0x03 | 0x83 |
| 0x08 | 0x04 | 0x84 |
| 0x08 | 0x05 | 0x85 |
| 0x08 | 0x06 | 0x86 |
| 0x08 | 0x07 | 0x87 |
| 0x08 | 0x08 | 0x88 |
| 0x08 | 0x09 | 0x89 |
| 0x08 | 0x0A | 0x8A |
| 0x08 | 0x0B | 0x8B |
| 0x08 | 0x0C | 0x8C |
| 0x08 | 0x0D | 0x8D |
| 0x08 | 0x0E | 0x8E |
| 0x08 | 0x0F | 0x8F |
| 0x09 | 0x00 | 0x90 |
| 0x09 | 0x01 | 0x91 |
| 0x09 | 0x02 | 0x92 |
| 0x09 | 0x03 | 0x93 |
| 0x09 | 0x04 | 0x94 |
| 0x09 | 0x05 | 0x95 |
| 0x09 | 0x06 | 0x96 |
| 0x09 | 0x07 | 0x97 |
| 0x09 | 0x08 | 0x98 |
| 0x09 | 0x09 | 0x99 |
| 0x09 | 0x0A | 0x9A |
| 0x09 | 0x0B | 0x9B |
| 0x09 | 0x0C | 0x9C |
| 0x09 | 0x0D | 0x9D |
| 0x09 | 0x0E | 0x9E |
| 0x09 | 0x0F | 0x9F |
| 0x0A | 0x00 | 0xA0 |
| 0x0A | 0x01 | 0xA1 |
| 0x0A | 0x02 | 0xA2 |
| 0x0A | 0x03 | 0xA3 |
| 0x0A | 0x04 | 0xA4 |
| 0x0A | 0x05 | 0xA5 |
| 0x0A | 0x06 | 0xA6 |
| 0x0A | 0x07 | 0xA7 |
| 0x0A | 0x08 | 0xA8 |
| 0x0A | 0x09 | 0xA9 |
| 0x0A | 0x0A | 0xAA |
| 0x0A | 0x0B | 0xAB |
| 0x0A | 0x0C | 0xAC |
| 0x0A | 0x0D | 0xAD |
| 0x0A | 0x0E | 0xAE |
| 0x0A | 0x0F | 0xAF |
| 0x0B | 0x00 | 0xB0 |
| 0x0B | 0x01 | 0xB1 |
| 0x0B | 0x02 | 0xB2 |
| 0x0B | 0x03 | 0xB3 |
| 0x0B | 0x04 | 0xB4 |
| 0x0B | 0x05 | 0xB5 |
| 0x0B | 0x06 | 0xB6 |
| 0x0B | 0x07 | 0xB7 |
| 0x0B | 0x08 | 0xB8 |
| 0x0B | 0x09 | 0xB9 |
| 0x0B | 0x0A | 0xBA |
| 0x0B | 0x0B | 0xBB |
| 0x0B | 0x0C | 0xBC |
| 0x0B | 0x0D | 0xBD |
| 0x0B | 0x0E | 0xBE |
| 0x0B | 0x0F | 0xBF |
| 0x0C | 0x00 | 0xC0 |
| 0x0C | 0x01 | 0xC1 |
| 0x0C | 0x02 | 0xC2 |
| 0x0C | 0x03 | 0xC3 |
| 0x0C | 0x04 | 0xC4 |
| 0x0C | 0x05 | 0xC5 |
| 0x0C | 0x06 | 0xC6 |
| 0x0C | 0x07 | 0xC7 |
| 0x0C | 0x08 | 0xC8 |
| 0x0C | 0x09 | 0xC9 |
| 0x0C | 0x0A | 0xCA |
| 0x0C | 0x0B | 0xCB |
| 0x0C | 0x0C | 0xCC |
| 0x0C | 0x0D | 0xCD |
| 0x0C | 0x0E | 0xCE |
| 0x0C | 0x0F | 0xCF |
| 0x0D | 0x00 | 0xD0 |
| 0x0D | 0x01 | 0xD1 |
| 0x0D | 0x02 | 0xD2 |
| 0x0D | 0x03 | 0xD3 |
| 0x0D | 0x04 | 0xD4 |
| 0x0D | 0x05 | 0xD5 |
| 0x0D | 0x06 | 0xD6 |
| 0x0D | 0x07 | 0xD7 |
| 0x0D | 0x08 | 0xD8 |
| 0x0D | 0x09 | 0xD9 |
| 0x0D | 0x0A | 0xDA |
| 0x0D | 0x0B | 0xDB |
| 0x0D | 0x0C | 0xDC |
| 0x0D | 0x0D | 0xDD |
| 0x0D | 0x0E | 0xDE |
| 0x0D | 0x0F | 0xDF |
| 0x0E | 0x00 | 0xE0 |
| 0x0E | 0x01 | 0xE1 |
| 0x0E | 0x02 | 0xE2 |
| 0x0E | 0x03 | 0xE3 |
| 0x0E | 0x04 | 0xE4 |
| 0x0E | 0x05 | 0xE5 |
| 0x0E | 0x06 | 0xE6 |
| 0x0E | 0x07 | 0xE7 |
| 0x0E | 0x08 | 0xE8 |
| 0x0E | 0x09 | 0xE9 |
| 0x0E | 0x0A | 0xEA |
| 0x0E | 0x0B | 0xEB |
| 0x0E | 0x0C | 0xEC |
| 0x0E | 0x0D | 0xED |
| 0x0E | 0x0E | 0xEE |
| 0x0E | 0x0F | 0xEF |
| 0x0F | 0x00 | 0xF0 |
| 0x0F | 0x01 | 0xF1 |
| 0x0F | 0x02 | 0xF2 |
| 0x0F | 0x03 | 0xF3 |
| 0x0F | 0x04 | 0xF4 |
| 0x0F | 0x05 | 0xF5 |
| 0x0F | 0x06 | 0xF6 |
| 0x0F | 0x07 | 0xF7 |
| 0x0F | 0x08 | 0xF8 |
| 0x0F | 0x09 | 0xF9 |
| 0x0F | 0x0A | 0xFA |
| 0x0F | 0x0B | 0xFB |
| 0x0F | 0x0C | 0xFC |
| 0x0F | 0x0D | 0xFD |
| 0x0F | 0x0F | 0xFE |
| 0x0F | 0x0F | 0xFF |

Figure 7:
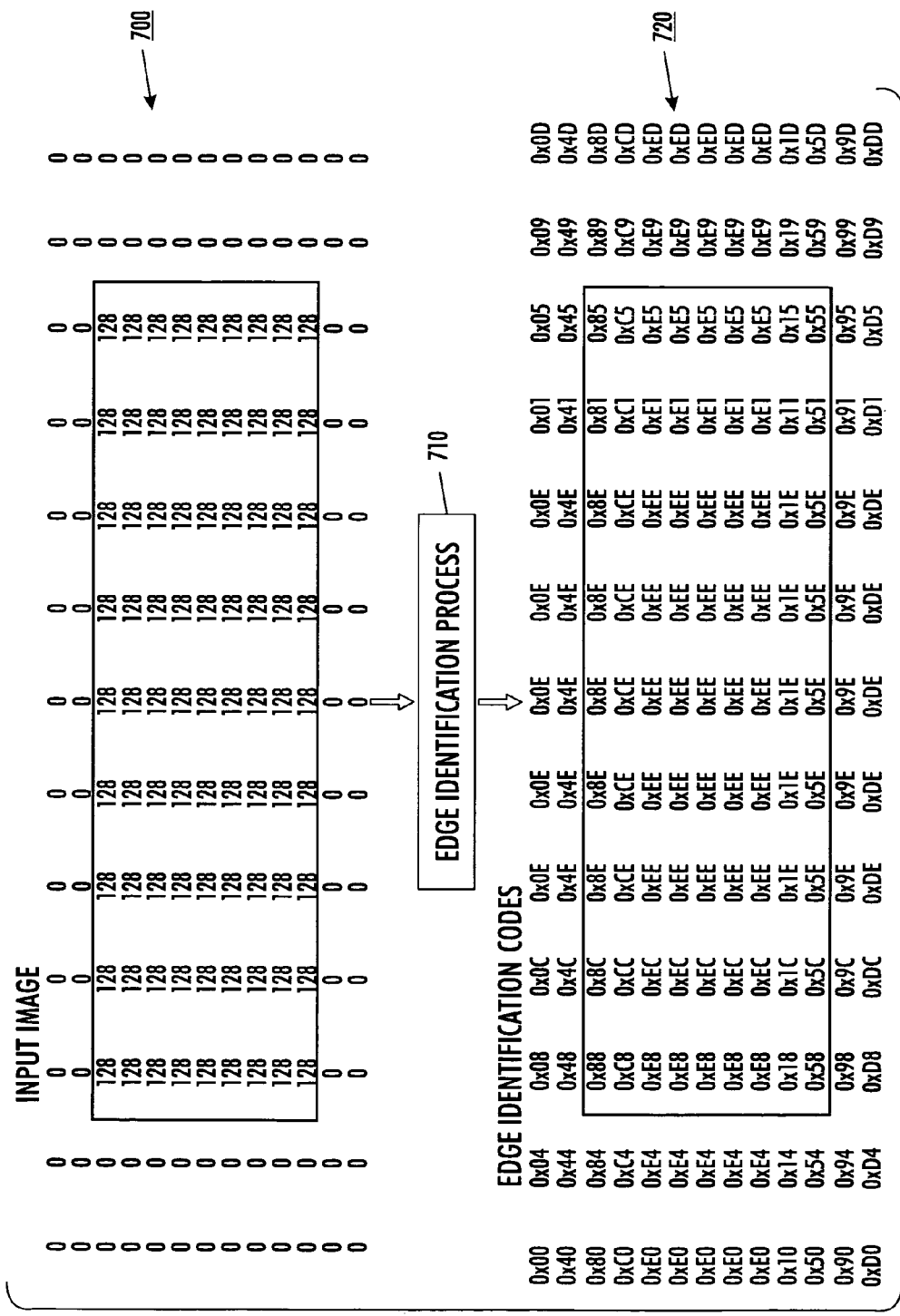
FIG. 7 is an example input digital image possessing edges and an array of output edge identification codes according to the teachings presented herein.

FIG. 7 shows an example digital image 700 and a resultant image plane of codes 720 as produced by an edge identification process 710 as diagrammatically illustrated in FIG. 6. The image 700 is a square of pixels each possessing a value of 255 within a field of pixels each possessing a value of 0. The image is input to the edge identification process 710 to produce edge identification codes, each shown in hexadecimal form in the image plane of codes 720. As can be seen in the example, the codes 720 differentiate inside edge, outside edge, vertical edge, horizontal edge, and positions about a corner. This edge information can be used to direct tinted edge enhancement.

Below, we describe the halftoning process that is directed by the edge-identification code to perform a halftoning process for the enhancement of tinted edge or a conventional halftoning process.

The overall halftoning processes utilizes edge-identification codes and a step of halftoning that applies halftoning to edge pixels in a different manner than the halftoning applied to the interior region of the tint or image segment. In rendering the edge pixels it is preferred to use a halftone that is related to the interior halftone by some number of common spatial frequency harmonics. A halftone that is related by common harmonics will avoid the undesirable phenomenon of beats between halftones, which would result in a lower frequency "beaded" appearance at the edge. Examples of common-harmonic screening for an edge may include, but are not limited to, (1) the same screen with different tone reproduction characteristics, (2) the same screen angles and frequencies with a different spot function, possibly phase shifted, (3) a dot screen whose frequency vectors can be generated by the frequency vectors of the interior screen, (4) a line screen whose frequency vectors can be generated by the frequency vectors of the interior screen. It should be noted that for any of the harmonically related screens the phase and amplitude of the edge halftones are parameters that can be optimized for a given marking process and edge orientation (position and angle). Additional insight in harmonically related halftones maybe be found in U.S. application Ser. No. 10/909,627 incorporated by reference above. Examples of rendering edge borders with common harmonic screens are shown in FIGS. 3, 4, 7, 9, 11 & 12.

Figure 8:
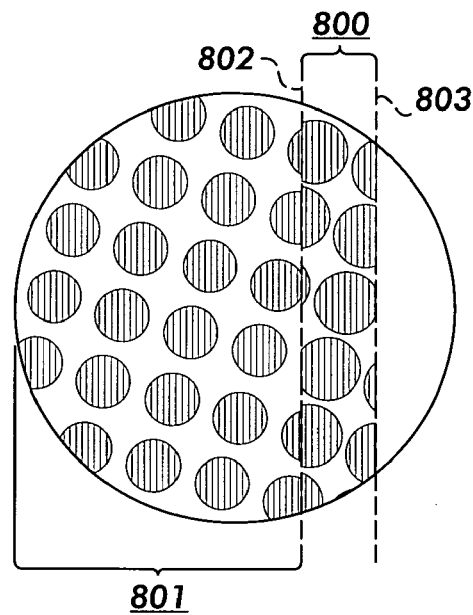
FIG. 8 is a schematic of harmonically related halftones applied to the image border as per the disclosure where the same angles and frequencies as the body are employed in the border but with a boosted signal.

As depicted in FIG. 8 there is shown a pixel border 800 provided for segment 801 as is delineated by lines 802 and 803. In the example shown in FIG. 8, the contone level for the edge border pixels 800 is boosted by some predetermined amount, resulting in a dilation of the halftone dots. By using the existing (interior) halftone, the beating of two different halftones is avoided while enabling partial compensation for the dot erosion/deletion at the edges, thereby producing sharper tinted fonts and line-art. Similar to existing CRM (Contone Rendering Module) outlining methods, selection of the boost levels is a delicate tradeoff. Boosting that is too conservative results in excessive edge dot erosion, and overly aggressive boosting gives rise to objectionably dark outlines at the segment edges. The compensation (boost) level can be empirically determined from calibration prints that are visually inspected for quality and subsequently implemented in a lookup table (LUT). The boost levels will in general be a function of the original edge levels and surrounding contone levels. The boost level can be separation independent utilizing a 1-dimensional TRC (Tone reproduction Curve) for each color separation, for example four TRC's for conventional cyan, magenta, yellow, black printing. Or in but one possible alternative, the boost levels can involve utilization of cross-separation terms such as with four, 4-Dimensional-to-1-Dimensional look-up tables for color-separation printing.

The boosting method has the particular advantage of versatility, since it is TRC driven—the boost TRC's can be computed off line. Another advantage is separate boost TRC's can be constructed for each halftone. This is important since edge xerographics can be highly dependent on the halftone frequency and angle, and thus provide different edge erosion characteristics. One exemplary approach uses a single edge boost TRC for each separation (for each halftone), with the edge compensation applied only for tinted text/line-art segments that get overlaid against a white background. In an experiment using this method with the appropriate boost TRC chosen, the text/line sharpness rivaled an existing CRM (Contone Rendering Module) outlining algorithm, and in some cases exceeded it.

Another class of edge screens useful in addressing the present problem utilizes frequency components that are rotated or flipped about an axis. For example, when using a 170 cpi 15° interior screen, an edge screen rotated by 45° may be beneficial, such as a 240 cpi 60° screen. There is some potential for image quality improvement based on this teaching in combination with U.S. Publication No. 2003/0058474, herein incorporated by reference in its entirety, where screens used at two different orientations were found to solve a different halftone jaggy problem.

Figure 9:
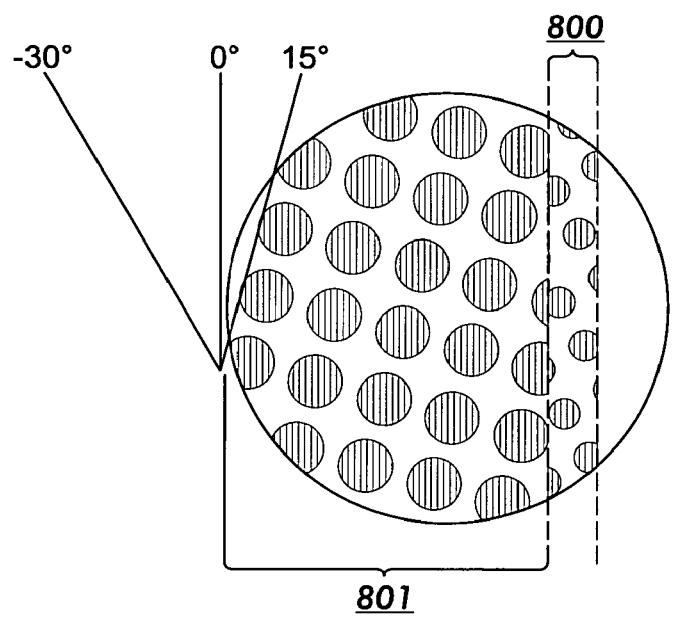
FIG. 9 is a schematic of harmonically related halftones applied to the image border as per the disclosure where the angles and frequencies employed in the border are rotated 45°, frequency increased by $\sqrt{2}$.
Figure 10:
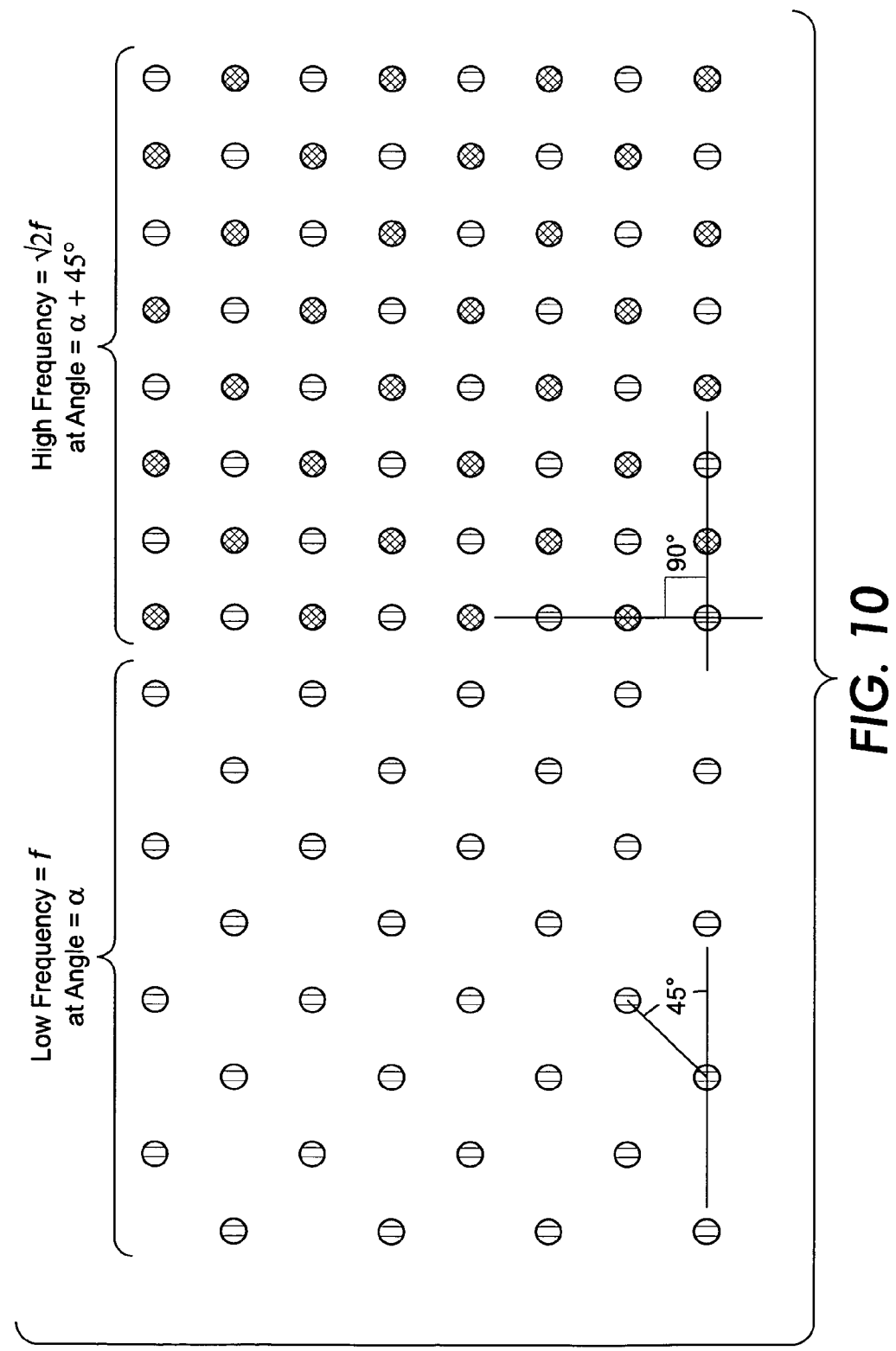
FIG. 10 is a schematic of a low frequency dot screen and a high frequency dot screen that share harmonics.
Figure 11:
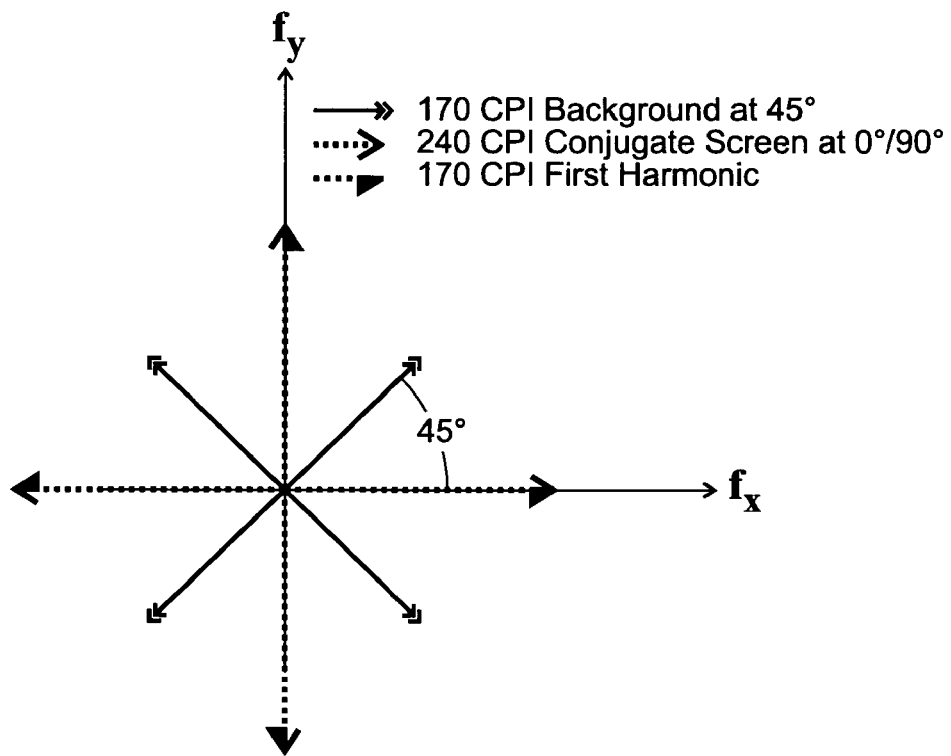
FIG. 11 illustrates a frequency vector diagram of the halftone screens used in FIG. 10.

FIG. 9 depicts an example of harmonically related halftones applied to the image segment pixel border 800 where the angles and frequencies employed in the border 300 are rotated 45°, and the frequency increased by the square root of two ($\sqrt{2}$). In FIG. 10, a schematic of a dot screen pair as provided for FIG. 9 is illustrated. In FIG. 10, the low frequency dot screen has a frequency f and an angle $\alpha$. The high frequency dot screen has a frequency $\sqrt{2} \times f$, and an angle of alpha plus 45 degrees ($\alpha+45°$). The fundamental frequency of the low frequency screen is shown as dark circles. In the high frequency screen those same dots are shown with additional dots placed midway between the dark dots. The two screens have common frequency components, i.e., matched harmonics. As will be appreciated by those skilled in the art, the edge quality is thus improved with the halftone provided in FIGS. 9 and 10, especially for lighter text, compared to the image rendered using non-harmonically related halftones. The frequency vector diagram for this configuration is shown in FIG. 11. FIG. 11 shows that the fundamental frequency of the high frequency screen is the same as the first harmonic of the low frequency screen, with the fundamental low frequency being displaced 45° from the first harmonic.

Figure 12:
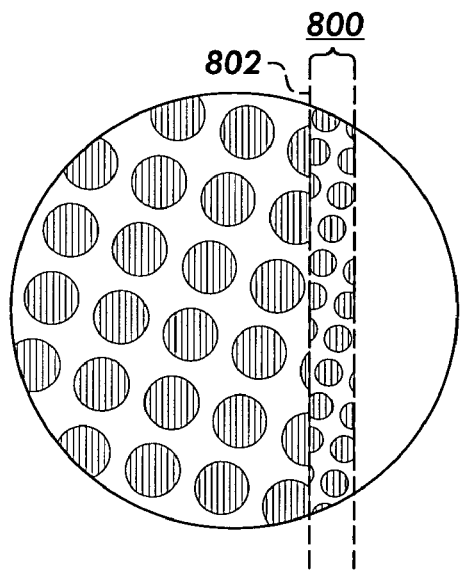
FIG. 12 is a schematic of harmonically related halftones applied to the image border as per the disclosure where the angles and frequencies employed in the border are frequency doubled.
Figure 13:
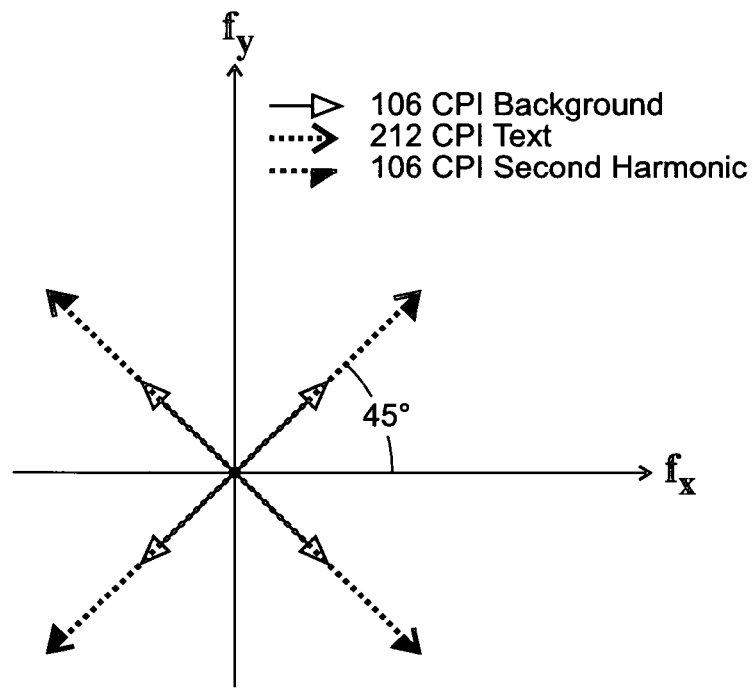
FIG. 13 illustrates a frequency vector diagram of the halftone screens used in FIG. 12.

FIG. 12 schematically depicts harmonically related halftones applied to the image border 800 as per the disclosure where the angles and frequencies employed in the border 800 are frequency doubled. The segment 801 and border 800 employ using two halftone screens with matched harmonics in which the fundamental halftone frequencies of the adjacent halftone dot screens have an integer multiple frequency relationship and the same phase angles. In the image in FIG. 12, the border 800 is printed using a dot screen having a fundamental frequency of 212 cpi and angle of 45°. (Note that cpi is defined here as cycles per inch. This could be used as a measure of frequency for line screens or dot screens, but is typically limited in use to dot screens.) The segment 801 is printed using a dot screen having a fundamental frequency of 106 cpi and angle of 45°. The harmonics of the screens are matched, and thus do not produce objectionable beats at their boundary 802. Note that the frequency of the border halftone screen 800 is 2 times the frequency of the segment halftone screen 801. FIG. 13 diagrams how the fundamental frequency vectors for the 212 cpi border at 45° are matched to second harmonics of the 106 cpi segment.

Figure 14:
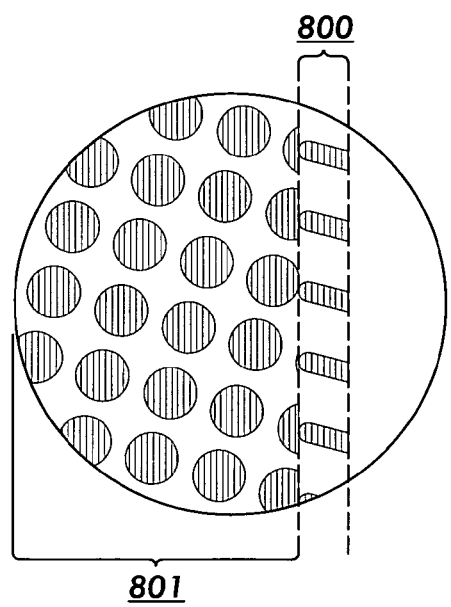
FIG. 14 is a schematic of harmonically related halftones applied to the image border as per the disclosure where the angles and frequencies employed in the border are a line screen aligned with one frequency vector.
Figure 15:
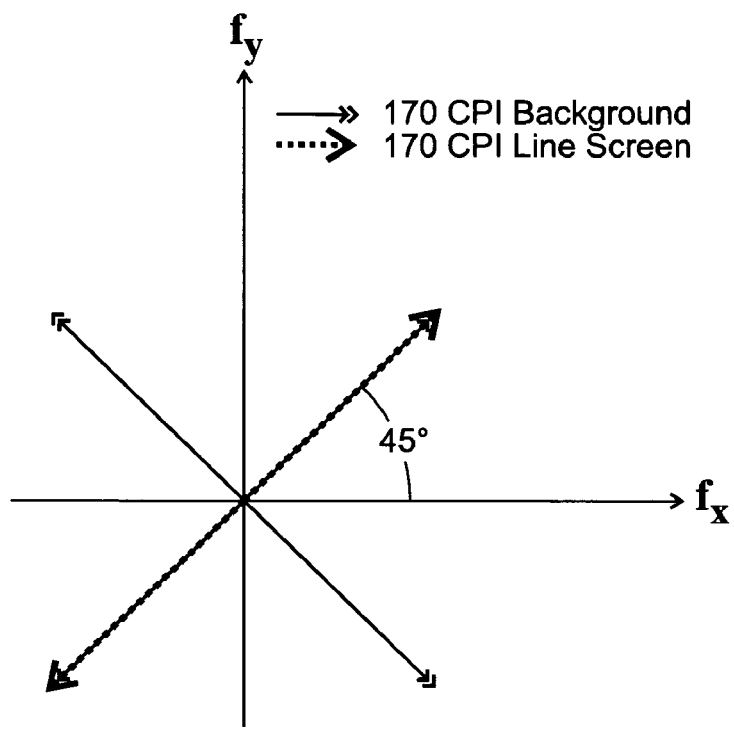
FIG. 15 illustrates a frequency vector diagram for halftone screens used in FIG. 14.
Figure 16:
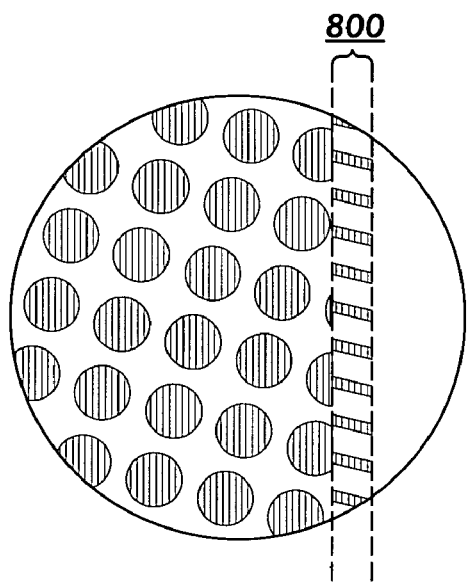
FIG. 16 is a schematic of harmonically related halftones applied to the image border as per the disclosure where the angles and frequencies employed in the border are a double frequency line screen.
Figure 17A:
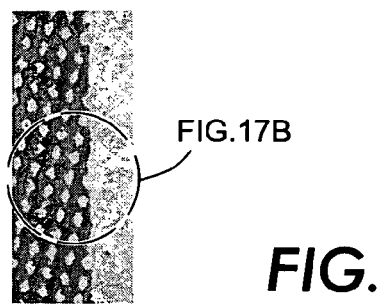
FIG. 17A is a photomicrograph of a print from an offset printer.
Figure 17B:
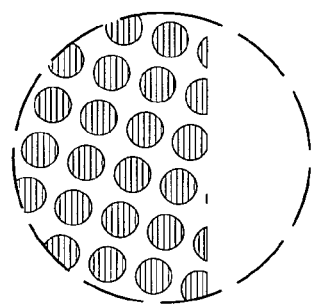
FIG. 17B is a blow-up of the circled area in FIG. 17A.
Figure 18A:
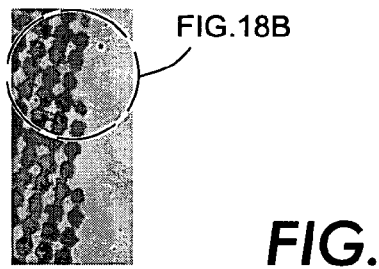
FIG. 18A is a photomicrograph of a print from an electrophotographic digital printer.
Figure 18B:
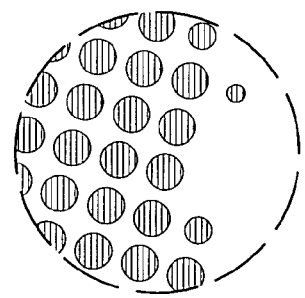
FIG. 18B is a blow-up of the circled area in FIG. 18A.

FIG. 14 schematically depicts harmonically related halftones applied to the image border as per the disclosure where the angles and frequencies employed in the border area 800 are a line screen aligned with one frequency vector of the halftone in segment 801. The rendering as embodied here is with a dot screen having a fundamental frequency of 170 cpi and angle of 45° for the segment 801 and 170 LPI at 135° line screen for the border 800. (Note that LPI means lines per inch. Although some experts in the field of halftoning use these units for a measure of frequency for either line screens or dot screens, its use is limited herein to line screens for clarity of discussion.) FIG. 15 shows the frequency vector diagram for this configuration with the 170 LPI line screen aligned with one axis of the 170 cpi halftone at 45°. Further, it may be desirable that line screen type for the border area 300 to be at a higher frequency multiple than the dot screen. FIG. 16 provides depiction of harmonically related halftones applied to the image border as per the disclosure above where the angles and frequencies employed in the border are at 2× or a double frequency line screen.

As will be appreciated by one skilled in the art, the above discussion assumed orthogonal halftone screens because it was simpler to describe the concepts using the assumption that the fundamental frequencies of a dot screen were the same in both directions and the angles between those frequencies were related by 90°. Some halftone screens are constructed based on non-orthogonal cells. The concept of the desirability of matched harmonics still applies. The only difference is that the design must account for the different frequency vectors, and not assume they are the same in both directions.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. An image processing method for transforming a selected portion of an initial color digital image received from a computer operable scanner into digital image objects with enhanced halftone edges for output in a computer print engine comprising:
    a) selecting a target color pixel location within the initial color digital image received from a computer operable scanner;
    b) observing a set of color pixels within a pixel observation window superimposed on the initial color digital image, relative to the target pixel location;
    c) generating, through use of a computer processor, edge-state codes for a plurality of pairs of neighboring vectors of pixels within the pixel observation window;
    d) generating, through use of the computer processor, using a computer architecture edge-identification codes from the plurality of edge-state codes using at least one look-up table wherein the edge-state codes are generated by
        i) generating a sum of weighted pixels values, for each of the vectors of pixels of the plurality of pairs of neighboring pixels that run through the pixel observation window using the computer processor;
        ii) calculating sum-to-sum differences for the neighboring pairs of vectors through use of the computer processor; and
        iii) encoding the edge-state codes for each pair of the neighboring vectors of pixels by using one or more bits to encode a magnitude and one bit to encode a sign of the sum-to-sum differences;
    and wherein the edge-identification codes indicate proximity to a tinted edge; and,
    e) transforming the edge-identification codes and the initial color digital image at the target color pixel into a halftone screen comprised of at least one of:
        a first halftone screen comprising a low fundamental frequency f and a first angle; and
        a second halftone screen comprising a high fundamental frequency $\sqrt{2} \times f$ and a second angle where the high fundamental frequency and the second angle have common frequency components which are harmonically matched to the first frequency and the first angle output through use of a computer operable print engine.

2. The method of claim 1, wherein at least one of the first and second halftone screens comprise dot screens and wherein the first and second angles are rotated 45° from one another and the first fundamental frequency is $\sqrt{2}$ multiple of the second fundamental frequency.

3. The method of claim 1, wherein at least one of the first halftone screen comprises a dot screen and the second halftone screen comprises a line screen; wherein the first and second angles are substantially the same; and wherein the first fundamental frequency is an integer multiple of the second fundamental frequency.

4. The method of claim 1, wherein at least one of the first halftone screen comprises a dot screen and the second halftone screen comprises a line screen and wherein the first and second angles are rotated 45° from one another and the first fundamental frequency is $\sqrt{2}$ multiple of the second fundamental frequency.

5. The method of claim 1, wherein at least one of the first and second halftone screens comprise line screens having the same angle and wherein the first fundamental frequency is an integer multiple of the second fundamental frequency.

6. The method of claim 1, wherein at least one of the first and second halftone screens comprise line screens and wherein the first and second angles are rotated 90° from one another and wherein the first fundamental frequency is an integer multiple of the second fundamental frequency.

7. The method of claim 1, wherein at least one of the first and second halftone screens comprise non-orthogonal cells.

8. An image processing method for transformation of the edges of a selected portion of an input initial digital color image into an output digital image objects with enhanced halftone edges comprising:
    a) selecting a target color pixel location within the input initial digital color image;
    b) observing a set of color pixels within a pixel observation window superimposed on the input initial digital color image, relative to the target pixel location;
    c) generating, using a computer processor and a computer architecture, edge-state codes for a plurality of pairs of neighboring vectors of pixels within the pixel observation window, wherein the plurality of vectors are of at least two different orientations;
    d) generating, using the computer processor, edge-identification codes from the plurality of edge-state codes using at least one look-up table wherein the edge-state codes are generated by: and,
        i) generating a sum of weighted pixels values, for each of the vectors of pixels of the plurality of pairs of neighboring pixels that run through the pixel observation window using the computer processor;
        ii) calculating sum-to-sum differences for the neighboring pairs of vectors through use of the computer processor; and
        iii) encoding the edge-state codes for each pair of the neighboring vectors of pixels by using one or more bits to encode a magnitude and one bit to encode a sign of the sum-to-sum differences;
    and wherein the edge-identification codes indicate proximity to a tinted edge; and,
    e) utilizing the edge-identification codes to transform the digital image at the target pixel into a halftone screen comprised of at least one of:
        a first halftone screen comprising a first fundamental frequency and a first angle, and a second halftone screen comprising a second fundamental frequency and a second angle, wherein the second frequency and second angle are harmonically matched to the first frequency and first angle output through use of a print engine.

9. The method of claim 8, wherein at least one of the first and second halftone screens comprise dot screens and wherein the first and second angles are rotated 45° from one another and the first fundamental frequency is √2 multiple of the second fundamental frequency.

10. The method of claim 8, wherein the at least one of first halftone screen comprises a dot screen and the second halftone screen comprises a line screen; wherein the first and second angles are substantially the same; and wherein the first fundamental frequency is an integer multiple of the second fundamental frequency.

11. The method of claim 8, wherein at least one of the first halftone screen comprises a dot screen and the second halftone screen comprises a line screen and wherein the first and second angles are rotated 45° from one another and the first fundamental frequency is √2 multiple of the second fundamental frequency.

12. The method of claim 8, wherein at least one of the first and second halftone screens comprise line screens having the same angle and wherein the first fundamental frequency is an integer multiple of the second fundamental frequency.

13. The method of claim 8, wherein at least one of the first and second halftone screens comprise line screens and wherein the first and second angles are rotated 90° from one another and wherein the first fundamental frequency is an integer multiple of the second fundamental frequency.

14. The method of claim 8, wherein at least one of the first and second halftone screens comprise non-orthogonal cells.

15. An image processing method for transforming a digital image comprised of a set of pixels into an output color digital image with improved enhanced halftone edges through use of a computer processor, comprising:
  a) observing a set of pixels within a pixel observation window superimposed on the digital image, relative to a target pixel location;
  b) generating, through use of a computer processor, edge-state codes for a plurality of pairs of neighboring vectors of pixels within the pixel observation window;
  c) generating through use of the computer processor, edge-identification codes from the plurality of edge-state codes using at least one look-up table wherein the edge-state codes are generated by:
    i) generating a sum of weighted pixels values, for each of the vectors of pixels of the plurality of pairs of neighboring pixels that run through the pixel observation window using the computer processor;
    ii) calculating sum-to-sum differences for the neighboring pairs of vectors through use of the computer processor; and
    iii) encoding the edge-state codes for each pair of the neighboring vectors of pixels by using one or more bits to encode a magnitude and one bit to encode a sign of the sum-to-sum differences;
  and wherein the edge-identification codes indicate proximity to a tinted edge; and,
  d) transforming the edge-identification codes and the digital image at the target pixel into a halftone screen comprised of at least one of:
    a halftone screen comprising a first fundamental low frequency and a first angle; and
    a second halftone screen comprising a second fundamental high frequency and a second angle, wherein the second frequency and second angle are harmonically matched to the first frequency and first angle.

16. The method of claim 15, wherein at least one of the high fundamental frequency and the low fundamental frequency are related to the same harmonic and the first angle is displaced 45° from the second angle.

17. The method of claim 15 wherein the plurality of vectors are aligned at a first orientation.

18. The method of claim 15 wherein the plurality of vectors are aligned at a plurality of orientations.

19. The method of claim 18 wherein the plurality of orientations is taken from vertical, horizontal, diagonal left, diagonal right.

20. The method of claim 18 wherein each orientation of the plurality of orientations is used to generate an orientated-edge-identification code, and the bits forming the orientated-edge-identification codes are used to form an address into a look-up table that points to the edge identification code.

* * * * *